(12) United States Patent
Park et al.

(10) Patent No.: US 11,175,530 B2
(45) Date of Patent: Nov. 16, 2021

(54) LIQUID CRYSTAL DISPLAY PANEL AND LIQUID CRYSTAL DISPLAY DEVICE INCLUDING THE SAME

(71) Applicant: Samsung Display Co., Ltd., Yongin-Si (KR)

(72) Inventors: Haeil Park, Seoul (KR); Yongseok Kim, Seoul (KR); Jinho Park, Suwon-si (KR); Gabsoo Han, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 249 days.

(21) Appl. No.: 16/038,579

(22) Filed: Jul. 18, 2018

(65) Prior Publication Data

US 2019/0121194 A1 Apr. 25, 2019

(30) Foreign Application Priority Data

Oct. 20, 2017 (KR) .......................... 10-2017-0136368

(51) Int. Cl.
*G02F 1/1335* (2006.01)
*G02F 1/13357* (2006.01)
(Continued)

(52) U.S. Cl.
CPC ...... *G02F 1/133528* (2013.01); *G02F 1/1336* (2013.01); *G02F 1/1343* (2013.01); *G02F 1/13306* (2013.01); *G02F 1/133502* (2013.01); *G02F 1/133514* (2013.01); *G02F 1/133526* (2013.01); *G02F 1/133606* (2013.01);
(Continued)

(58) Field of Classification Search
None
See application file for complete search history.

(56) References Cited

U.S. PATENT DOCUMENTS 6,002,139 A * 12/1999 Katagiri ............. G06K 7/10702
250/227.24
9,804,319 B2 10/2017 Dubrow et al.
(Continued)

FOREIGN PATENT DOCUMENTS

CN 105954932 A 9/2016
EP 2679645 A1 1/2014
(Continued)

OTHER PUBLICATIONS

Extended European Search Report for Application No. 18200398.8 dated Jan. 2, 2019.

*Primary Examiner* — Edward J Glick
*Assistant Examiner* — Anthony G Quash
(74) *Attorney, Agent, or Firm* — Cantor Colburn LLP

(57) ABSTRACT

A liquid crystal display ("LCD") panel and an LCD device according to an exemplary embodiment may provide a first base substrate, a first polarizing layer disposed between the first base substrate and a liquid crystal layer, a first low refraction layer disposed between the first base substrate and the first polarizing layer and having a refractive index less than that of the first base substrate, and a color converting member disposed between the first low refraction layer and the first polarizing layer and including a quantum dot in an integrated manner, to realize excellent optical characteristics and have a small thickness.

29 Claims, 17 Drawing Sheets

(51) Int. Cl.
*G02F 1/133* (2006.01)
*G02F 1/1343* (2006.01)
*G02F 1/1333* (2006.01)

(52) U.S. Cl.
CPC .. *G02F 1/133302* (2021.01); *G02F 1/133607* (2021.01); *G02F 1/133614* (2021.01)

(56) References Cited

U.S. PATENT DOCUMENTS

| | | | |
|---|---|---|---|
| 9,817,181 B2 | 11/2017 | Fan | |
| 2005/0041174 A1* | 2/2005 | Numata | G02F 1/133621 349/61 |
| 2010/0207964 A1 | 8/2010 | Kimmel et al. | |
| 2013/0242240 A1* | 9/2013 | Yin | G02F 1/133514 349/106 |
| 2013/0337161 A1* | 12/2013 | Akimoto | C08J 7/046 427/162 |
| 2016/0003998 A1 | 1/2016 | Benoit et al. | |
| 2016/0041430 A1* | 2/2016 | Lee | G02F 1/133514 349/96 |
| 2016/0085068 A1* | 3/2016 | Abele | G02B 19/0085 359/205.1 |
| 2016/0149098 A1* | 5/2016 | Song | H01L 25/0753 362/612 |
| 2016/0322543 A1* | 11/2016 | Jeon | F21V 9/30 |
| 2016/0363713 A1 | 12/2016 | Dubrow et al. | |
| 2017/0003442 A1 | 1/2017 | Chen et al. | |
| 2017/0058199 A1 | 3/2017 | Jang et al. | |
| 2017/0131439 A1* | 5/2017 | Kobori | G02B 1/118 |
| 2017/0199429 A1 | 7/2017 | Kang et al. | |
| 2017/0357043 A1* | 12/2017 | Kang | G02F 1/133615 |
| 2018/0246373 A1* | 8/2018 | Nakamura | G02F 1/133617 |
| 2018/0364408 A1* | 12/2018 | Hwang | G02F 1/133504 |

FOREIGN PATENT DOCUMENTS

| | | | | |
|---|---|---|---|---|
| JP | 2016181474 A | * | 10/2016 | F21S 2/00 |
| KR | 1020130074891 A | | 7/2013 | |
| KR | 1020170085174 A | | 7/2017 | |
| KR | 1020180137627 A | | 12/2018 | |
| WO | 2008152436 A1 | | 12/2008 | |
| WO | 2014061510 A1 | | 4/2014 | |
| WO | 2014123836 A1 | | 8/2014 | |

* cited by examiner

LIQUID CRYSTAL DISPLAY PANEL AND LIQUID CRYSTAL DISPLAY DEVICE INCLUDING THE SAME

This U.S. application claims priority under 35 U.S.C. § 119 of Korean Patent Application No. 10-2017-0136368, filed on Oct. 20, 2017, and all the benefits accruing therefrom under 35 U.S.C. § 119, the content of which in its entirety is herein incorporated by reference.

BACKGROUND

1. Field

Exemplary embodiments of the invention herein relate to a liquid crystal display ("LCD") panel and an LCD device including the same, and more particularly, to an LCD panel having a small thickness by integrating optical components with each other and an LCD device including the same.

2. Description of Related Art

Display devices having various shapes have been used to display image information. Since a liquid crystal display ("LCD") device has various advantages such as low power consumption, the LCD device is being used for a large-sized display device, a portable display device, or the like. In case of the LCD device, various kinds of optical members are added to a backlight unit so as to increase an optical efficiency and improve a color reproduction property.

SUMMARY

In recent years, a thin-type display device having a small thickness in addition to excellent optical characteristics is increasingly demanded. However, when various optical members are added to enhance display quality of the liquid crystal display ("LCD") device, it is a limitation that the display device increases in total thickness.

Exemplary embodiments of the invention provide an LCD panel having a reduced thickness while maintaining optical characteristics.

Exemplary embodiments of the invention also provide an LCD device having an excellent color reproduction property and high brightness and realizing a thin-type display device by integrating an optical member with a display panel substrate.

An exemplary embodiment of the invention provides an LCD panel including a first substrate and a second substrate, which face each other, with a liquid crystal layer disposed therebetween. The first substrate includes a first base substrate, a first polarizing layer disposed between the first base substrate and the liquid crystal layer, a first low refraction layer disposed between the first base substrate and the first polarizing layer and having a refractive index less than that of the first base substrate, and a color converting member disposed between the first low refraction layer and the first polarizing layer and including a quantum dot.

In an exemplary embodiment, the color converting member may further include a first base surface contacting a top surface of the first low refraction layer, and a second base surface facing the first base surface and disposed adjacent to the first polarizing layer.

In an exemplary embodiment, the color converting member may further include at least one barrier layer disposed adjacent to at least one surface of the first base surface and the second base surface In an exemplary embodiment, the at least one barrier layer may include at least one inorganic layer.

In an exemplary embodiment, the color converting member may further include a base resin, and light scattering particles dispersed in the base resin.

In an exemplary embodiment, the first low refraction layer may be disposed directly on the first base substrate.

In an exemplary embodiment, the first low refraction layer may have a refractive index that is equal to or greater than about 1.2 and equal to or less that about 1.4.

In an exemplary embodiment, a void may be defined in the first low refraction layer.

In an exemplary embodiment, the first substrate may further include a light collecting member disposed on the color converting member.

In an exemplary embodiment, the light collecting member may include a first light collecting pattern layer including a plurality of light collecting pattern parts which collect light in a direction toward the liquid crystal layer, and a second low refraction layer disposed on the first light collecting pattern layer and filled between the plurality of light collecting pattern parts.

In an exemplary embodiment, a cross-section of each of the plurality of light collecting pattern parts, which is perpendicular to the first base substrate, may have a triangular shape in which two sides have a same length.

In an exemplary embodiment, the light collecting member may further include a second light collecting pattern layer disposed on the second low refraction layer and including a plurality of cross pattern parts, and a third low refraction layer disposed on the second light collecting pattern layer, each of the plurality of light collecting pattern parts has a prism shape extending in a first direction, and each of the plurality of cross pattern parts has a prism shape extending in a second direction which is perpendicular to the first direction.

In an exemplary embodiment, each of the plurality of light collecting pattern parts may have a lens shape protruding in the direction toward the liquid crystal layer.

In an exemplary embodiment, a cross-section, which is parallel to the first base substrate, of each of the plurality of light collecting pattern parts may have a circular, elliptical, or polygonal shape, and a cross-section, which is perpendicular to the first base substrate, of each of the plurality of light collecting pattern parts may have a semi-circular or semi-elliptical shape.

In an exemplary embodiment, the second low refraction layer may have a refractive index less than that of the first light collecting pattern layer.

In an exemplary embodiment, the light collecting member may be disposed directly on the color converting member.

In an exemplary embodiment, wherein the first base substrate may further include a light guide pattern part disposed on a bottom surface of the first base substrate.

In an exemplary embodiment, the first substrate may include a single glass substrate or a single polymer substrate, and the first base substrate is the single glass substrate or the single polymer substrate.

In an exemplary embodiment, the second substrate may include a second base substrate, a second polarizing layer disposed on the liquid crystal layer, a circuit layer disposed on a bottom surface of the second base substrate disposed adjacent to the liquid crystal layer, and a color filter layer disposed between the liquid crystal layer and the circuit layer and including a plurality of filter parts allowing light in wavelength areas different from each other to pass therethrough.

In an exemplary embodiment, the second substrate may further include a light shielding part overlapping a boundary between filter parts adjacent to each other among the plurality of filter parts.

In an exemplary embodiment, the first substrate may further include a light shielding part overlapping a boundary between filter parts adjacent to each other among the plurality of filter parts and disposed on the first polarizing layer.

In an exemplary embodiment, the second polarizing layer may be disposed between the liquid crystal layer and the color filter layer, or between the color filter layer and the second base substrate.

In an exemplary embodiment of the invention, an LCD panel includes a first substrate and a second substrate with a liquid crystal layer disposed therebetween. The first substrate includes a first base substrate including a light guide pattern part, a first low refraction layer disposed directly on the first base substrate and having a refractive index less than that of the first base substrate, a color converting member disposed directly on the first low refraction layer and including a quantum dot, a light collecting member and a first polarizing layer, which are disposed between the color converting member and the liquid crystal layer, and a common electrode disposed on the light collecting member and the first polarizing layer, and the second substrate includes a second base substrate, a circuit layer disposed between the liquid crystal layer and the second base substrate, a color filter layer disposed between the liquid crystal layer and the circuit layer and including a plurality of filter parts each emitting light having a different color, a pixel electrode disposed between the liquid crystal layer and the color filter layer, and a second polarizing layer disposed on the color filter layer.

In an exemplary embodiment, the light collecting member may be disposed directly on the color converting member.

In an exemplary embodiment, each of the first and second substrates may be bent.

In an exemplary embodiment, the liquid crystal layer may include vertical alignment liquid crystal molecules.

In an exemplary embodiment of the invention, an LCD device includes an LCD panel including a first substrate and a second substrate, which face each other, with a liquid crystal layer disposed therebetween, and a light source member which provides light to the LCD panel. The first substrate includes a first base substrate including a light guide pattern part, a first polarizing layer disposed between the first base substrate and the liquid crystal layer a first low refraction layer disposed between the first base substrate and the first polarizing layer and having a refractive index less than that of the first base substrate, and a color converting member disposed between the first low refraction layer and the first polarizing layer and including a color converting member including at least one quantum dot, and the light source member includes a light emitting diode package having a light emitting surface facing a side surface of the first base substrate.

In an exemplary embodiment, the light source member may further include a circuit board, and the light emitting diode package may be disposed on the circuit board.

In an exemplary embodiment, the light emitting diode package may include a light emitting diode and a sealing part which covers the light emitting diode, and the sealing part may include at least one phosphor.

In an exemplary embodiment, the light emitting diode may emit blue light, and the at least one quantum dot may include a first quantum dot excited by the blue light to emit green light and a second quantum dot excited by the blue light to emit red light.

In an exemplary embodiment, the light emitting diode may emit blue light, the sealing part may include a first phosphor of the at least one phosphor excited by the blue light to emit red light, and the at least one quantum dot may include a first quantum dot excited by the blue light to emit green light.

In an exemplary embodiment, the light emitting diode may emit blue light, the sealing part may include a second phosphor excited by the blue light to emit green light, and the at least one quantum dot may include a second quantum dot excited by the blue light to emit red light.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
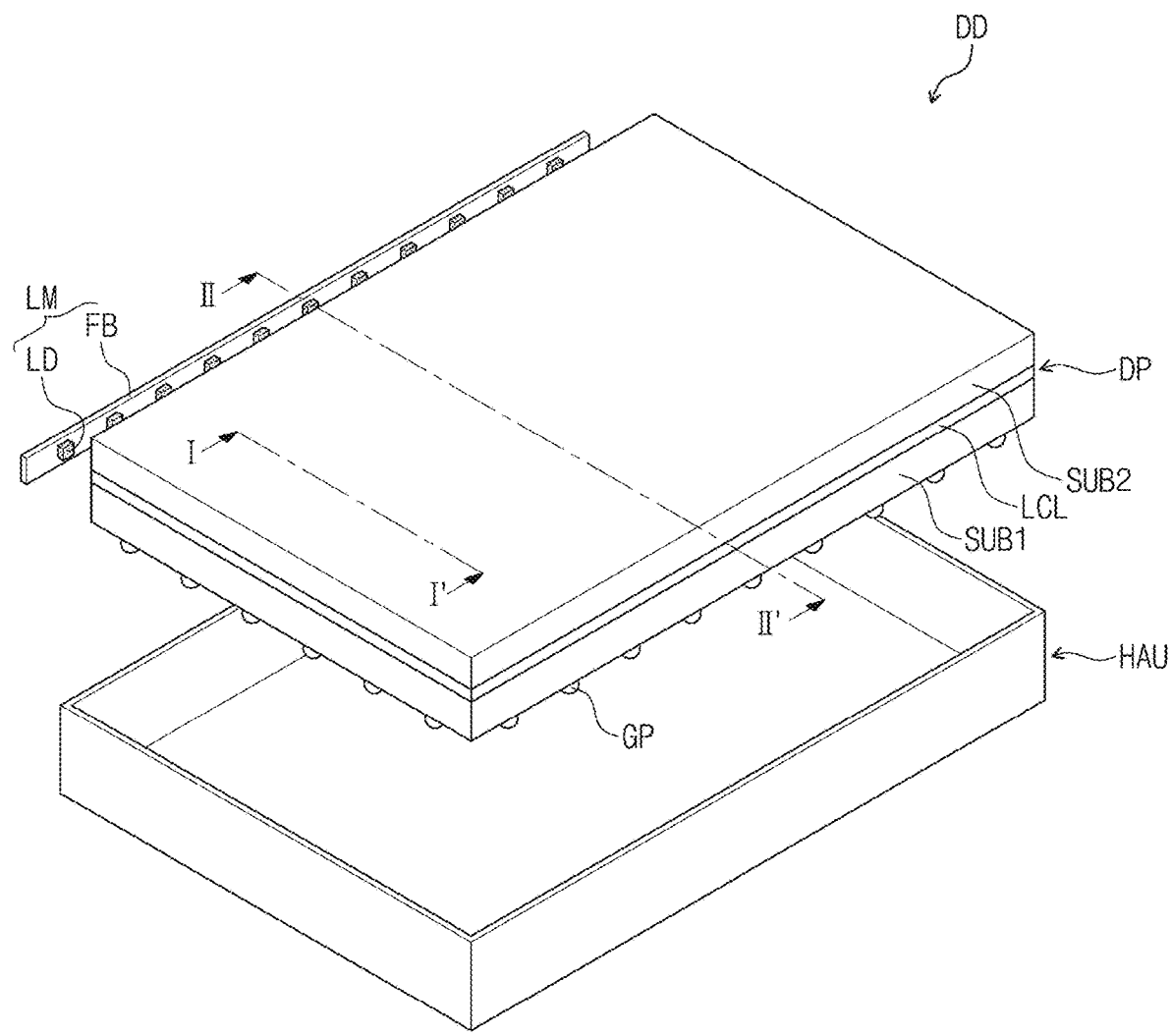
FIG. 1 is an exploded perspective view of an exemplary embodiment of a liquid crystal display ("LCD") device.

Since the disclosure may have diverse modified embodiments, specific embodiments are illustrated in the drawings and are described in the detailed description of the invention. However, this does not limit the disclosure within specific embodiments and it should be understood that the disclosure covers all the modifications, equivalents, and replacements within the idea and technical scope of the disclosure.

Like reference numerals refer to like elements throughout. In the drawings, the dimensions and size of each structure are exaggerated, omitted, or schematically illustrated for convenience in description and clarity. It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another exemplary embodiment without departing from the scope of the appended claims. The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components.

In the specification, it will be understood that when a layer (or film), a region, or a plate is referred to as being 'on' another layer, region, or plate, it can be directly on the other layer, region, or plate, or intervening layers, regions, or plates may also be present. On the contrary to this, it will be understood that when a layer, a film, a region, or a plate is referred to as being 'under' another layer, region, or plate, it can be directly under the other layer (or film), region, or plate, or intervening layers, regions, or plates may also be present. Also, in the specification, it will also be understood that when a layer (or film) is referred to as being 'on' another layer or substrate, it can be disposed on a lower portion as well as an upper portion thereof.

When the word 'directly' is referred, it means that no intervening constituent element is present between a component such as a layer, a film, a region, or a plate and another component It will be understood that when a layer (or film) is referred to as being 'directly on' another layer or substrate, it can be directly on the other layer or substrate without an additional member disposed between two layers or two members.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, a liquid crystal display ("LCD") panel and an LCD device according to an exemplary embodiment of the invention will be described with reference to the accompanying drawings.

Figure 2:
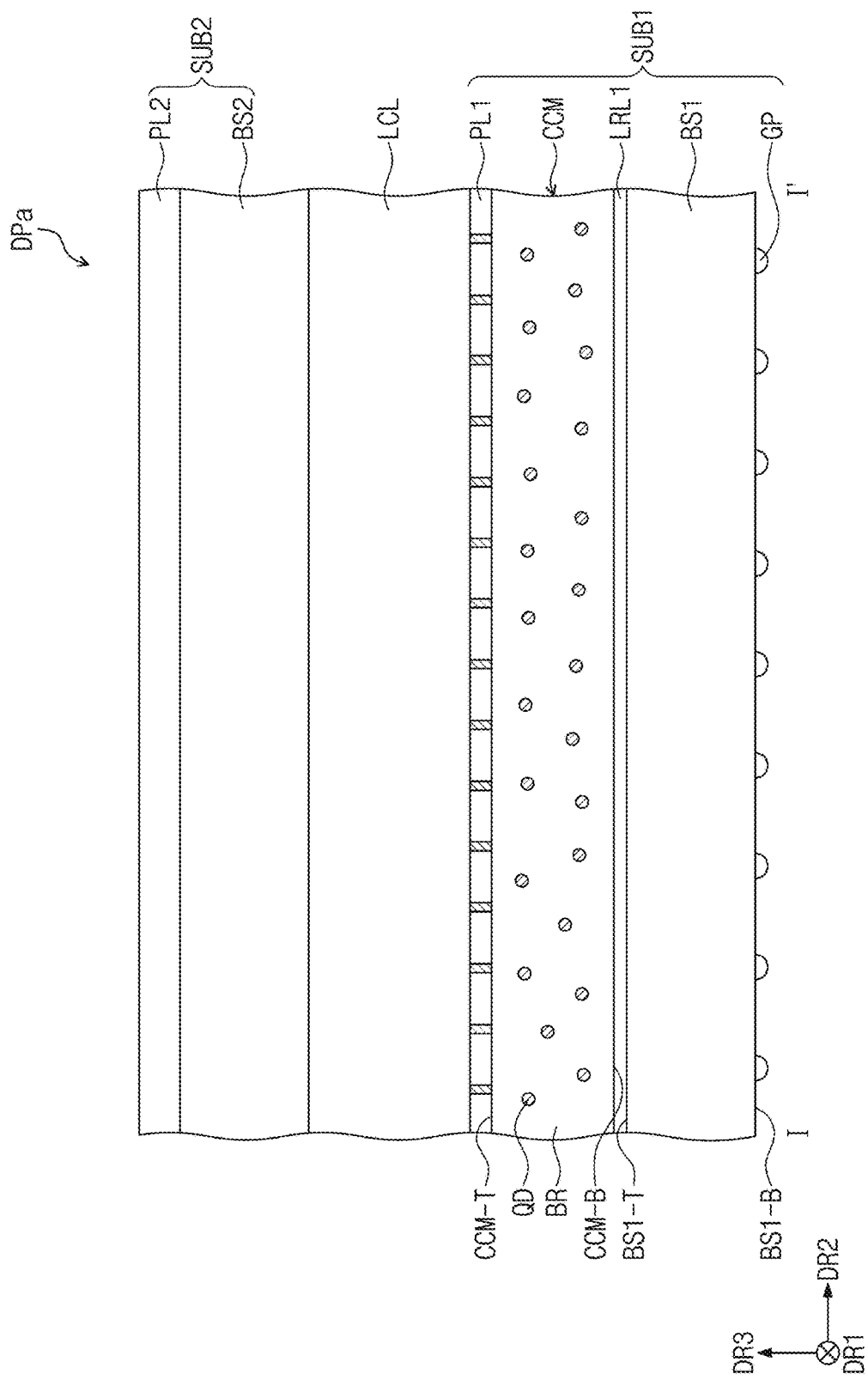
FIG. 2 is a cross-sectional view taken along line I-I' in the LCD device of an exemplary embodiment in FIG. 1.

FIG. 1 is an exploded perspective view of an LCD device according to an exemplary embodiment. FIG. 2 is a cross-sectional view illustrating a portion of an LCD panel included in an LCD device according to an exemplary embodiment.

Referring to FIG. 1, an LCD device DD may include an LCD panel DP and a light source member LM providing light to the LCD panel DP. The light source member LM may be disposed on at least one side of the LCD panel DP.

The LCD panel DP may include a first substrate SUB1 and a second substrate SUB2, which face each other, with a liquid crystal layer LCL disposed therebetween. A light emitting diode package LD of the light source member LM may have a light emitting surface facing a side surface of a first substrate SUB1 of the LCD panel DP.

First to third directional axes DR1 to DR3 are illustrated in FIG. 1. For convenience of description, the directional axes described in this specification, which have a relative concept, the first to third directional axes DR1 to DR3 may be defined as a direction in which an image is provided to a user. Also, the first directional axis DR1 and the second directional axis DR2 are perpendicular to each other, and the third directional axis DR3 is a normal direction with respect to a plane defined by the first and second directional axes DR1 and DR2.

The LCD device DD according to an exemplary embodiment may further include a housing HAU accommodating the LCD panel DP and the light source member LM. The housing HAU may cover the LCD panel DP and the light source member LM so as to expose a top surface of the second substrate SUB2, which is a display surface of the LCD panel DP. Also, the housing HAU may cover a portion of the top surface of the second substrate SUB2, which is the top surface of the LCD panel DP, in addition to a side surface and a bottom surface of the LCD panel DP.

FIG. 2 is a cross-sectional view illustrating a portion of the LCD panel DP, which corresponds to a portion taken along line I-I' of the LCD device DD according to the exemplary embodiment of FIG. 1, and FIG. 2 is a view illustrating a cross-section of the LCD panel DP on a surface parallel to a plane defined by the second and third directional axes DR2 and DR3.

A first substrate SUB1 of an LCD panel DPa according to the exemplary embodiment of FIG. 2 may include a first base substrate BS1, a first polarizing layer PL1 disposed on the first base substrate BS1, wherein the first polarizing layer PL1 is disposed closer to a liquid crystal layer LCL than the first base substrate BS1 is to the liquid crystal layer LCL, a first low refraction layer LRL1 disposed between the first base substrate BS1 and the first polarizing layer PL1, and a color converting member CCM disposed between the first low refraction layer LRL1 and the first polarizing layer PL1. In FIG. 2, the first base substrate BS1, the first low refraction layer LRL1, the color converting member CCM, and the first polarizing layer PL1 may be sequentially laminated in the direction of the third directional axis DR3.

In an exemplary embodiment, the first base substrate BS1 may include glass. However, the invention is not limited thereto. In an exemplary embodiment, the first base substrate BS1 may include a polymer resin such as an acrylic resin. The first base substrate BS1 may be used as a lower substrate of the LCD panel DPa according to an exemplary embodiment. The first base substrate BS1 may serve as a base member on which the color converting member CCM, the light collecting member LDM, and the first polarizing layer PL1, which will be described later, are disposed.

The first base substrate BS1 may include a light guide pattern part GP. The light guide pattern part GP may be disposed on a bottom surface BS1-B of the first base substrate BS1. The light guide pattern part GP changes a direction of light so that light emitted from the light source member LM and incident into one side surface of the first base substrate BS1 is transmitted to another side surface of the first base substrate BS1 or light incident in a direction of the bottom surface BS1-B of the first base substrate BS1 is transmitted to a direction of a top surface BS1-T of the first base substrate BS1. The one side surface of the first base substrate BS1, into which the light emitted from the light source member LM is incident, may be a light incident surface IS (refer to FIG. 15), and another side surface of the first base substrate BS1, which faces the one side surface that is the light incident surface IS (refer to FIG. 15), may be a light facing surface FS (refer to FIG. 15).

In the cross-sectional view of FIG. 2, although the light guide pattern part GP has a cross-section with a semi-circular shape, the invention is not limited thereto. In an exemplary embodiment, the light guide pattern part GP may have a cross-section having an inclined surface, for example. Also, unlike FIG. 2, the light guide pattern parts GP may have different sizes from each other, and the light guide pattern parts GP disposed on the first base substrate BS1 may have an arrangement density that is differently adjusted on the first base substrate BS1 according to a distance to the light source member LM.

Each of the light guide pattern parts GP may protrude from the bottom surface BS1-B of the first base substrate BS1 and be unitary with the first base substrate BS1. Also, although not shown in the drawing, the light guide pattern parts GP may be a recessed pattern that is recessed from the bottom surface BS1-B of the first base substrate BS1 in the third directional axis DR3.

The first base substrate BS1 including the light guide pattern part GP may serve as a lower substrate of the LCD panel DPa and simultaneously serve as a light guiding plate transmitting light provided from the light source member LM (refer to FIG. 1) to the liquid crystal layer LCL.

The first low refraction layer LRL1 may be disposed on the first base substrate BS1. The first low refraction layer LRL1 may be disposed directly on the first base substrate BS1. The first low refraction layer LRL1 may contact the top surface BS1-T of the first base substrate BS1 while being disposed directly on the first base substrate BS1. In an exemplary embodiment, the first low refraction layer LRL1 may be provided by being applied on the top surface BS1-T of the first base substrate BS1, for example. Although a coating method for forming the first low refraction layer LRL1 may include various methods such as slit coating, spin coating, roll coating, spray coating, or inkjet printing, the invention is not limited to the providing method of the first low refraction layer LRL1. In an alternative exemplary embodiment, the first low refraction layer LRL1 may be provided directly on the first base substrate BS1 by various methods such as a transfer method.

The first low refraction layer LRL1 may have a refractive index less than that of the first base substrate BS1. The first low refraction layer LRL1 may have a refractive index less than that of each of the first base substrate BS1 and the color converting member CCM. The first low refraction layer LRL1 may have a refractive index equal to or greater than about 1.2 and equal to or less than about 1.4. In an exemplary embodiment, the first low refraction layer LRL1 may have a refractive index equal to or greater than about 1.2 and equal to or less than about 1.25, for example. In an exemplary embodiment, the first low refraction layer LRL1 and the first base substrate BS1 may have a difference in refractive index, which is equal to or greater than about 0.2, for example.

Referring to FIGS. 1 and 2, as the first low refraction layer LRL1 has a refractive index less than that of the first base substrate BS1, the light emitted from the light source member LM and incident into the first base substrate BS1 may be effectively transmitted to another side surface of the first base substrate BS1, which is relatively spaced apart from the light source member LM. That is, as the first low refraction layer LRL1 has a refractive index equal to or greater than about 1.2 and equal to or less than about 1.4, which is less than that of the first base substrate BS1, total reflection may be effectively performed at a boundary between the first base substrate BS1 and the first low refraction layer LRL1, and the light emitted from the light source member LM may be effectively transmitted to the side surface of the first base substrate BS1, which is relatively spaced apart from the light source member LM.

Figure 3A:
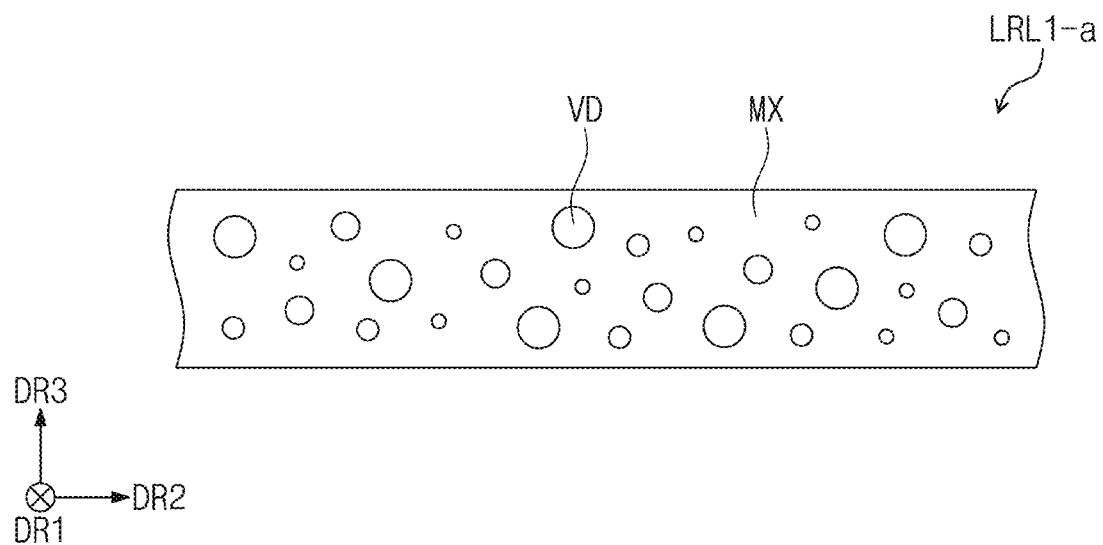
FIGS. 3A to 3C are cross-sectional views illustrating exemplary embodiments of a first low refraction layer.
Figure 3B:
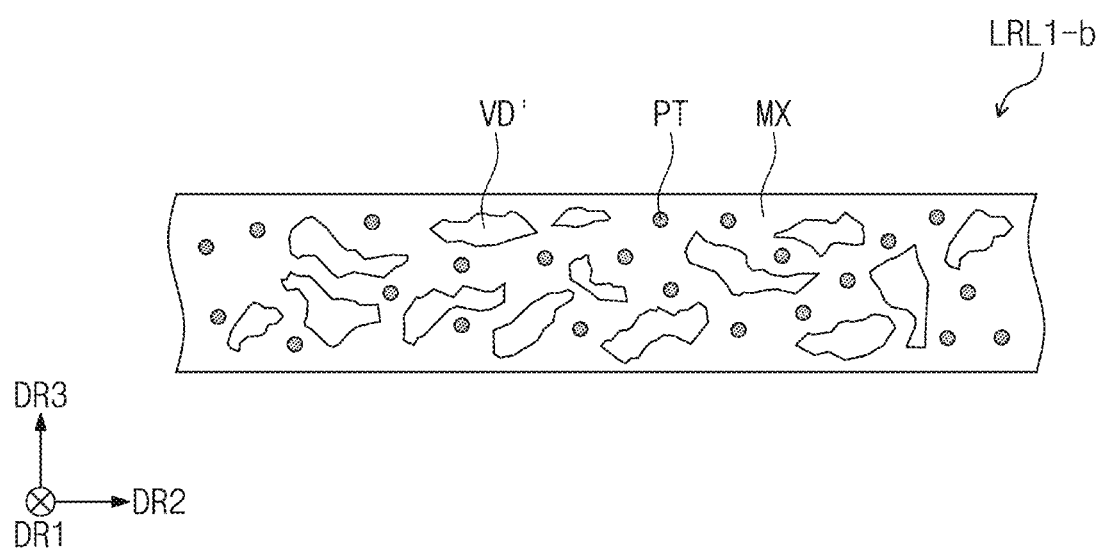
Figure 3C:
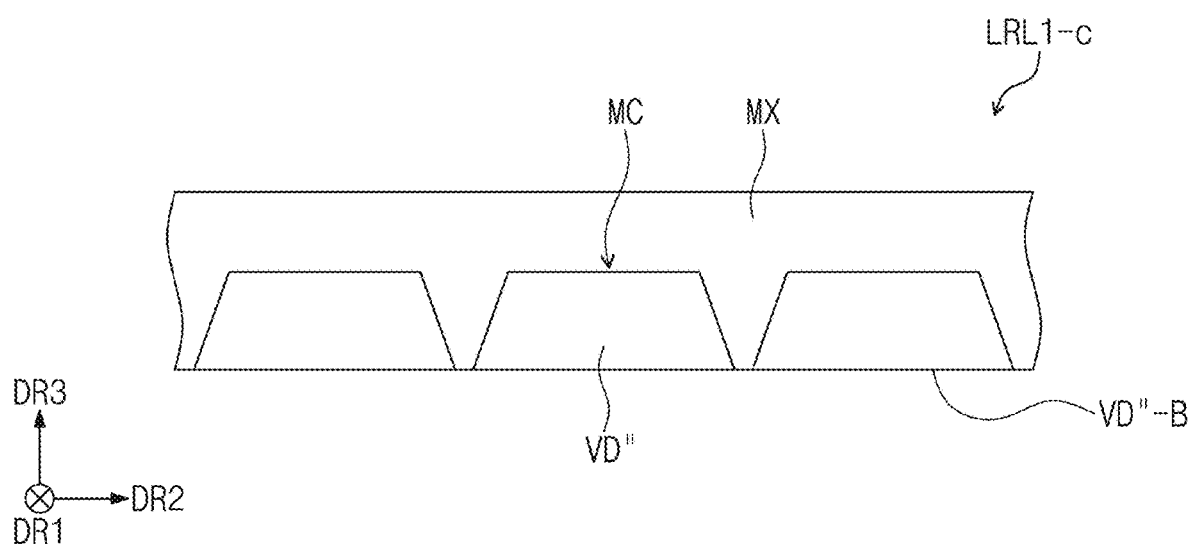

A void may be defined in the first low refraction layer LRL1. FIGS. 3A to 3C are cross-sectional views illustrating embodiments of the first low refraction layer LRL1 of FIG. 2. Referring to FIGS. 3A to 3C, voids VD, VD', and VD" may be defined in first low refraction layers LRL1-$a$, LRL1-$b$, and LRL1-$c$, respectively. The void VD, VD', and VD" may be filled with air, or filled with gas or liquid having a low refractive index. Each of the voids VD, VD', and VD" may have a cavity defined by an outer wall or a matrix MX material. Although the matrix MX material may include a polysiloxane or the like, the invention is not limited thereto. In an exemplary embodiment, the matrix MX material may include other organic materials, for example.

Referring to FIG. 3A, in an exemplary embodiment, the first low refraction layer LRL1-$a$ may include a matrix MX defining the void VD. Although the void VD has a cross-section of a circular shape or an elliptical shape in the exemplary embodiment of FIG. 3A, the invention is not limited thereto. In an exemplary embodiment, the first low refraction layer LRL1-$a$ in FIG. 3A may include a matrix MX that is entirely connected into one body like a foam resin and defines a plurality of voids VD defined in the matrix MX, for example. Also, in FIG. 3A, the void VD may be particles each having a shape of a core shell in which air or the like is filled.

FIG. 3B is a view illustrating another exemplary embodiment of a first low refraction layer LRL1-$b$. The first low refraction layer LRL1-$b$ in FIG. 3B may include a plurality of particles PT, a matrix MX that is entirely connected into one body while surrounding the particles PT, and defines a void VD'. Also, unlike the illustration in FIG. 3B, in another exemplary embodiment, the particles PT may be omitted from the first low refraction layer LRL1-$b$. In an exemplary embodiment, each of the particles PT may be a filler adjusting a refractive index and a mechanical strength of the first low refraction layer LRL1-$b$. The void VD' of the first low refraction layer LRL1-$b$ in FIG. 3B may have an amorphous shape unlike the void VD in FIG. 3A. In an exemplary embodiment, the first low refraction layer LRL1-*b* in FIG. 3B may be provided such that the particle PT and the matrix MX are mixed in a solvent, and then the solvent is dried or the matrix is hardened, for example. In an exemplary embodiment, the particles PT may be inorganic particles such as $SiO_2$, $Fe_2O_3$, and $MgF_2$.

In the exemplary embodiment of FIG. 3C, a first low refraction layer LRL1-*c* may define a void VD" having a micro cavity MC into which air, gas having a low refractive index, or liquid is inserted. The void VD" in FIG. 3C may be a micro cavity defined by a matrix MX. A bottom surface VD"-B of the void VD" may be a top surface BS1-T of the first base substrate BS1 (refer to FIG. 2), which contacts the first low refraction layer LRL1 (refer to FIG. 2).

Each of the first low refraction layers LRL1-*a* and LRL1-*c* in the exemplary embodiments of FIGS. 3A and 3C may have a refractive index value between those of the matrix MX and the void VD. Also, the first low refraction layer LRL1-*b* in the exemplary embodiment of FIG. 3B may have a refractive index that is obtained through combining those of the matrix MX and the void VD'.

When the voids VD, VD', and VD" are filled with air having a refractive index of about 1, or gas or liquid, which has a refractive index that is relatively less than that of a material used for the matrix MX in the exemplary embodiments of FIGS. 3A to 3C, the refractive index of each of the first low refraction layer LRL1-*a*, LRL1-*b*, and LRL1-*c* may be adjusted into a value equal to or greater than about 1.2 and equal to or less than about 1.4.

Referring back to FIG. 2, the first substrate SUB1 may include the color converting member CCM disposed on the first low refraction layer LRL1. The color converting member CCM may include the quantum dot QD.

The color converting member CCM may convert a color provided from the light source member LM (refer to FIG. 1) to transmit the converted color to the liquid crystal layer LCL. In an exemplary embodiment, the light provided from the light source member LM (refer to FIG. 1) may be converted into white light while passing through the color converting member CCM and then provided to the liquid crystal layer LCL, for example.

Also, the color converting member CCM in the exemplary embodiment of FIG. 2 may include a base resin BR and a quantum dot QD. The quantum dot QD may be dispersed in the base resin BR.

The base resin BR that is a medium in which quantum dots QD are dispersed may be provided by various resin compositions that are generally referred to as a binder. However, the invention is not limited thereto. In an exemplary embodiment, a medium in which quantum dots QD may be dispersed may be referred to as the base resin BR regardless of a name, an additional different function, or a constituent material, for example. The base resin BR may be a polymer resin. In an exemplary embodiment, the base resin BR may include an acryl-based resin, an urethane-based resin, a silicon-based resin, and an epoxy-based resin. The base resin BR may be a transparent resin, for example.

The quantum dot QD may be a particle converting a wavelength of light provided from the light source member LM (refer to FIG. 1). The quantum dot QD, which is a material having a crystal structure having a size of several nanometers, includes several hundred to several thousand atoms and generates a quantum confinement effect in which a band gap increases due to a small size thereof. When light having a wavelength with energy greater than that of a band gap is incident into the quantum dot QD, the quantum dot QD may become an excited state by absorbing the light and be dropped to a ground state while emitting light having a specific wavelength. The emitted light has a value corresponding to the band gap. When the quantum dot QD is adjusted in size and composition, a light emitting characteristic due to the quantum confinement effect may be adjusted.

The quantum dot QD may include Group II-VI compound, Group III-V compound, Group IV-VI compound, Group IV element, Group IV compound, and a combination thereof.

In an exemplary embodiment, the Group II-VI compound may include a binary compound including CdSe, CdTe, ZnS, ZnSe, ZnTe, ZnO, HgS, HgSe, HgTe, MgSe, MgS, and a combination thereof, a ternary compound including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof, and a quaternary compound including HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof, for example.

In an exemplary embodiment, the Group III-V compound may include a binary compound including GaN, GaP, GaAs, GaSb, AlN, AlP, AlAs, AlSb, InN, InP, InAs, InSb, and a combination thereof, a ternary compound including GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof, and a quaternary compound including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The Group III-V compound may include a binary compound including SnS, SnSe, SnTe, PbS, PbSe, PbTe, and a combination thereof, a ternary compound including SnSeS, SnSeTe, SnSTe, PbSeS, PbSeTe, PbSTe, SnPbS, SnPbSe, SnPbTe, and a combination thereof, and a quaternary compound including SnPbSSe, SnPbSeTe, SnPbSTe, and a combination thereof, for example. In an exemplary embodiment, the Group IV element may include Si, Ge, and a combination thereof, for example. In an exemplary embodiment, the Group IV compound may be a binary compound including SiC, SiGe, and a combination thereof, for example.

Here, the binary compound, the ternary compound, and the quaternary compound may exist in a particle with a uniform concentration or exist in the same particle while being divided in a state in which a concentration distribution is partially different.

The quantum dot QD may have a core shell structure including a core and a shell surrounding the core. In an alternative exemplary embodiment, the quantum dot QD may have a core/shell structure in which one quantum dot surrounds another quantum dot. An interface between the core and the shell may have a density gradient in which a density of an element existed in the shell gradually decreases in a direction toward a center thereof.

The quantum dot QD may be a particle having a size in a nanometer scale. In an exemplary embodiment, the quantum dot QD may have a full width of half maximum ("FWHM") of a light emitting wavelength spectrum, which is equal to or less than about 45 nanometers (nm), desirably equal to or less than about 40 nm, more desirably equal to or less than about 30 nm, for example, and, in this range, a color purity or a color reproduction property may be improved. Also, since light emitted through such a quantum dot QD is emitted in all directions, a viewing angle of the light may be improved.

Also, although the quantum dot QD has a shape that is generally used, the invention is not limited to the shape of the quantum dot QD. In more detail, the quantum dot may have a shape such as a spherical shape, a pyramid shape, a multi-arm shape, or a shape of a nano-particle, a nano-tube, a nano-wire, a nano-fiber, or a nano-plate shaped particle of a cubic.

Figure 4:
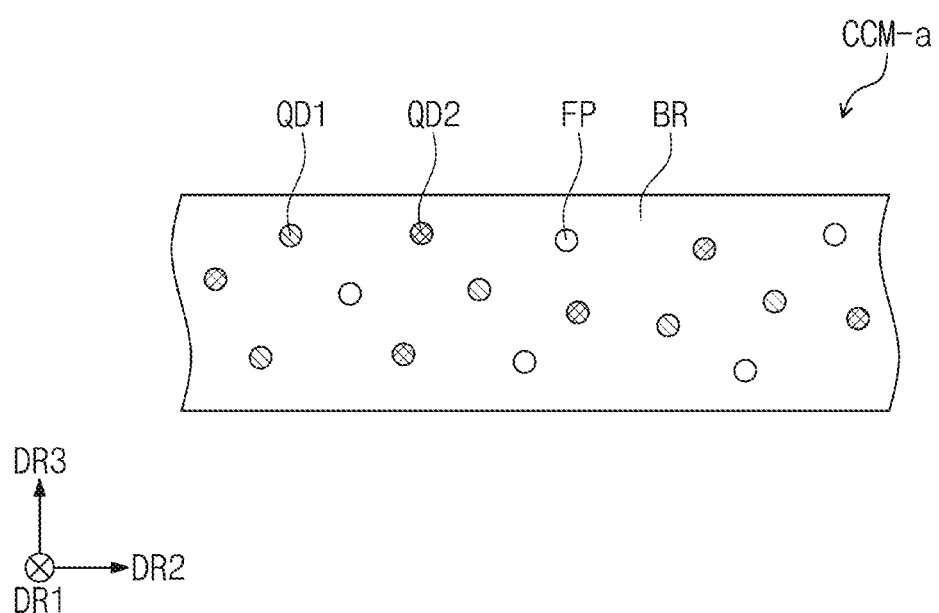
FIG. 4 is a cross-sectional view illustrating an exemplary embodiment of a portion of a color converting member included in an LCD panel.

In an exemplary embodiment, the color converting member CCM may include a plurality of quantum dots QD converting incident light into colors in wavelength areas different from each other. FIG. 4 is a cross-sectional view illustrating an exemplary embodiment of the color converting member. Referring to FIG. 4, in an exemplary embodiment, a color converting member CCM-a may include, e.g., a first quantum dot QD1 converting incident light having a specific wavelength into light having a first wavelength to emit the converted light and a second quantum dot QD2 converting incident light having a specific wavelength into light having a second wavelength to emit the converted light.

The color converting member CCM-a according to the exemplary embodiment of FIG. 4 may include a base resin BR, at least one quantum dot QD1 and QD2 dispersed in the base resin BR, and a scattered particle. In an exemplary embodiment, the scattered particle FP may be $TiO_2$ or silica-based nanoparticles, for example. The scattered particle FP may allow light emitted from the quantum dot QD1 and QD2 to be scattered and emitted out of the color converting member CCM-a.

In an exemplary embodiment, when the color converting member CCM-a includes a plurality of quantum dots QD1 and QD2, and light provided from the light source member LM (refer to FIG. 1) is light in a wavelength area of blue light, the first quantum dot QD1 may convert the light in a wavelength area of blue light into light in a wavelength of green light, and the second quantum dot QD2 may convert the light in a wavelength area of blue light into light in a wavelength of red light, for example. In detail, when the light provided from the light source member LM (refer to FIG. 1) is blue light having a maximum emission peak of about 420 nm to about 470 nm, the first quantum dot QD1 may emit green light having a maximum emission peak of about 520 nm to about 570 nm, and the second quantum dot QD2 may emit red light having a maximum emission peak of about 620 nm to about 670 nm. However, the invention is not limited to the above-described wavelength range of the blue light, the green light, and the red light. All of the wavelength ranges that may be recognized as blue light, green light, and red light in the technical field may be included.

The quantum dots QD1 and QD2 may be varied in color of light according to a particle size, and the first quantum dot QD1 and the second quantum dot QD2 may be different in the particle size. In an exemplary embodiment, the first quantum dot QD1 may have a particle size less than that of the second quantum dot QD2. Here, the first quantum dot QD1 may emit light having a wavelength shorter than that of the second quantum dot QD2, for example.

Referring back to FIG. 2, the color converting member CCM may be disposed directly on the first low refraction layer LRL1. The color converting member CCM may include a first base surface CCM-B contacting the first low refraction layer LRL1 and a second base surface CCM-T facing the first base surface CCM-B. That is, the color converting member CCM may be disposed directly on the first low refraction layer LRL1 so that the first base surface CCM-B that is a bottom surface thereof contacts a top surface of the first low refraction layer LRL1. In detail, the first base surface CCM-B may be a bottommost surface of the color converting member CCM, which is exposed to the outside to contact another member adjacent thereto, and the second base surface CCM-T may be a topmost surface of the color converting member CCM, which is exposed to the outside to contact another member adjacent thereto.

In an exemplary embodiment, the color converting member CCM may be provided by being applied on the first low refraction layer LRL1, for example. In an exemplary embodiment, the color converting member CCM may be applied on the first low refraction layer LRL1 by various methods such as slit coating, spin coating, roll coating, spray coating, and inject printing.

In an exemplary embodiment, the LCD panel DPa may include the first substrate SUB1 and the first polarizing layer PL1. The first polarizing layer PL1 may be an in-cell type polarizing layer disposed between the first base substrate BS1 and the liquid crystal layer LCL.

The first polarizing layer PL1 may be a coating-type polarizing layer or a polarizing layer provided through deposition. The first polarizing layer PL1 may be provided by applying a material including dichroic dye and a liquid crystal compound. In an alternative exemplary embodiment, the first polarizing layer PL1 may be a wire-grid type polarizing layer.

Although not shown in the drawing, the first substrate SUB1 of the LCD panel DPa according to an exemplary embodiment may include a common electrode (not shown) disposed on the first polarizing layer PL1 and disposed adjacent to the liquid crystal layer LCL. Also, the first substrate SUB1 may further include an alignment layer (not shown) for arranging liquid crystal molecules.

The first substrate SUB1 of the LCD panel DPa according to an exemplary embodiment may include only one substrate. In an exemplary embodiment, the first substrate SUB1 of the LCD panel DPa may include a single glass substrate or a single polymer substrate, and the first base substrate BS1 may be the above glass substrate or the single polymer substrate, for example. That is, the first substrate SUB1 may include only one substrate serving as a base to reduce a total thickness of the LCD panel DPa according to an exemplary embodiment.

The LCD panel DPa according to the exemplary embodiment of FIG. 2 may include a second substrate SUB2 facing the first substrate SUB1, and the second substrate SUB2 may include a second base substrate BS2 and a second polarizing layer PL2.

In an exemplary embodiment, the second base substrate BS2 may include glass, for example. However, the invention is not limited thereto. In an exemplary embodiment, the second base substrate BS2 may include a polymer resin or may include, e.g., an acryl resin. The second base substrate BS2 may be used as an upper substrate of the LCD panel DPa according to an exemplary embodiment, for example. The second base substrate BS2 may serve as a base on which a circuit layer (not shown) and a color filter layer (not shown), which will be described later, are disposed.

Although not specifically illustrated in FIG. 2, the second substrate SUB2 may further include a circuit layer (not shown) for controlling driving of liquid crystal molecules of the liquid crystal layer LCL and a color filter layer (not shown) including a filter part allowing a color in a specific wavelength area to pass therethrough.

That is, the LCD panel DP according to an exemplary embodiment may have a color filter on array ("COA") structure in which a circuit layer and a color filter layer are provided on one substrate. Detailed structure of the second substrate SUB2 will be described in more detail in the following description regarding FIG. 4.

Although the second polarizing layer PL2 is disposed on the second base substrate BS2 in FIG. 2, the invention is not limited thereto. Also, the second polarizing layer PL2 may include a polarizer layer and at least one protection layer protecting the polarizer layer.

In the exemplary embodiment of FIG. 2, the second polarizing layer PL2 included in the second substrate SUB2 may be a coating-type polarizing layer or a polarizing layer provided through deposition. In an alternative exemplary embodiment, unlike the above description, the second polarizing layer PL2 may be a film-type polarizing member that is separately manufactured and provided on the second base substrate BS2.

Referring to FIGS. 1 to 4, the LCD panel DPa according to an exemplary embodiment may include the first substrate SUB1 in which the first base substrate BS1 serving as a polarizing plate, the first low refraction layer LRL1, the color converting member CCM, and the first polarizing layer PL1 are integrally laminated to have a small thickness in comparison with an LCD panel in which an optical member such as a polarizing plate is provided separately from a substrate of a display panel. Also, the LCD panel DPa according to an exemplary embodiment may include the color converting member CCM including the quantum dot QD to realize the LCD panel with color purity and brightness improved.

Hereinafter, an LCD panel according to an exemplary embodiment will be described with reference to FIGS. 5 to 13. In describing FIGS. 5 to 13, contents overlapping those described previously in FIGS. 1 to 4 will not be described again, and only different points will be mainly described.

Figure 5:
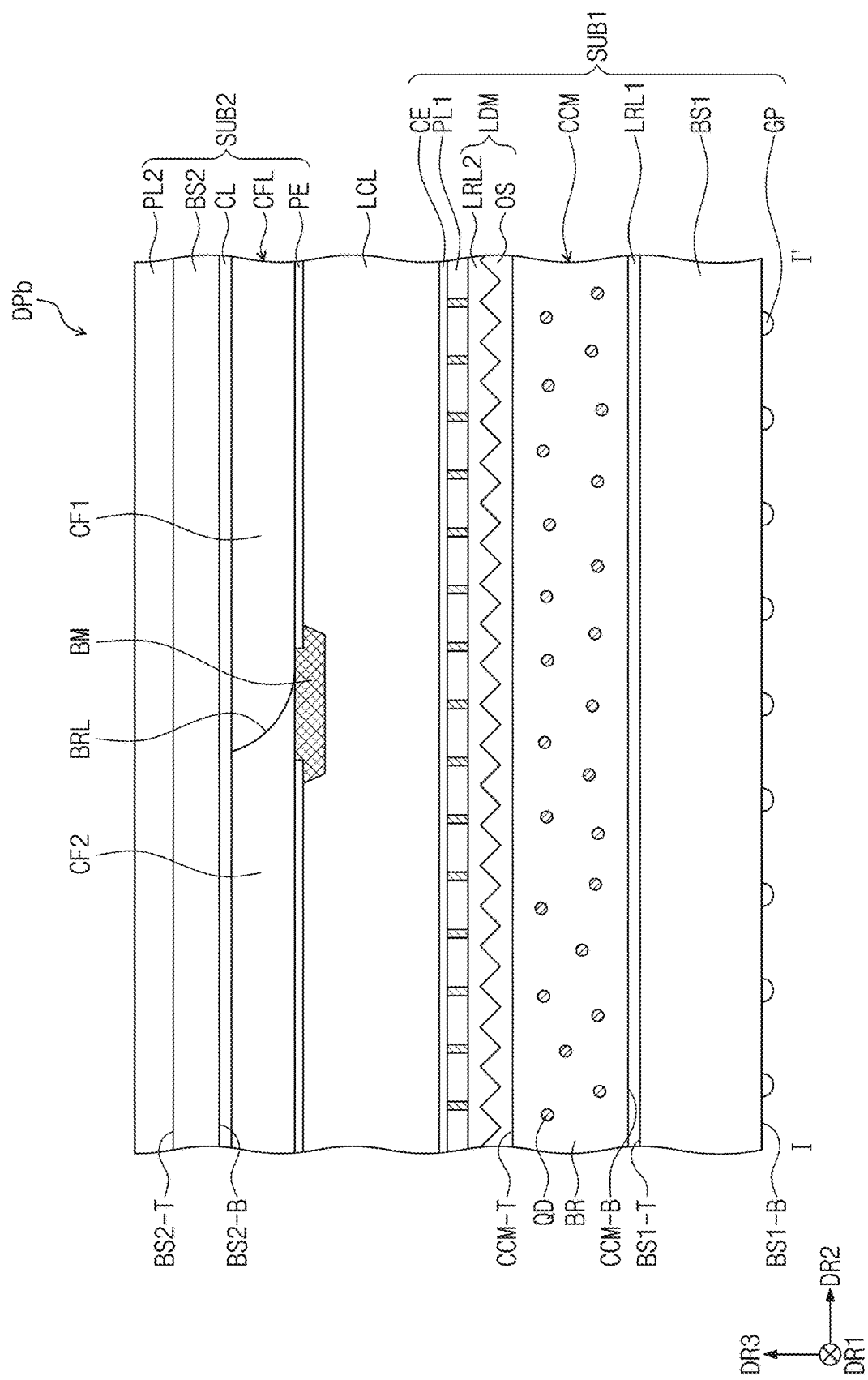
FIG. 5 is a cross-sectional view illustrating an exemplary embodiment of an LCD panel.

FIG. 5 is a cross-sectional view illustrating a cross-section of an LCD panel according to an exemplary embodiment. Referring to FIG. 5, an LCD panel DPb according to an exemplary embodiment includes a first substrate SUB1, and a second substrate SUB2, which face each other, with a liquid crystal layer LCL disposed therebetween.

The first substrate SUB1 includes a first base substrate BS1, a first low refraction layer LRL1, a color converting member CCM, a light collecting member LDM, and a first polarizing layer PL1. The LCD panel DPb according to the exemplary embodiment in FIG. 5 may further include the light collecting member LDM in the first substrate SUB1 in comparison with the LCD panel DPa according to the exemplary embodiment in FIG. 2. Also, in FIG. 5, a configuration of the second substrate SUB2 is illustrated in more detail in comparison with the LCD panel DPa according to the exemplary embodiment in FIG. 2.

Figure 6A:
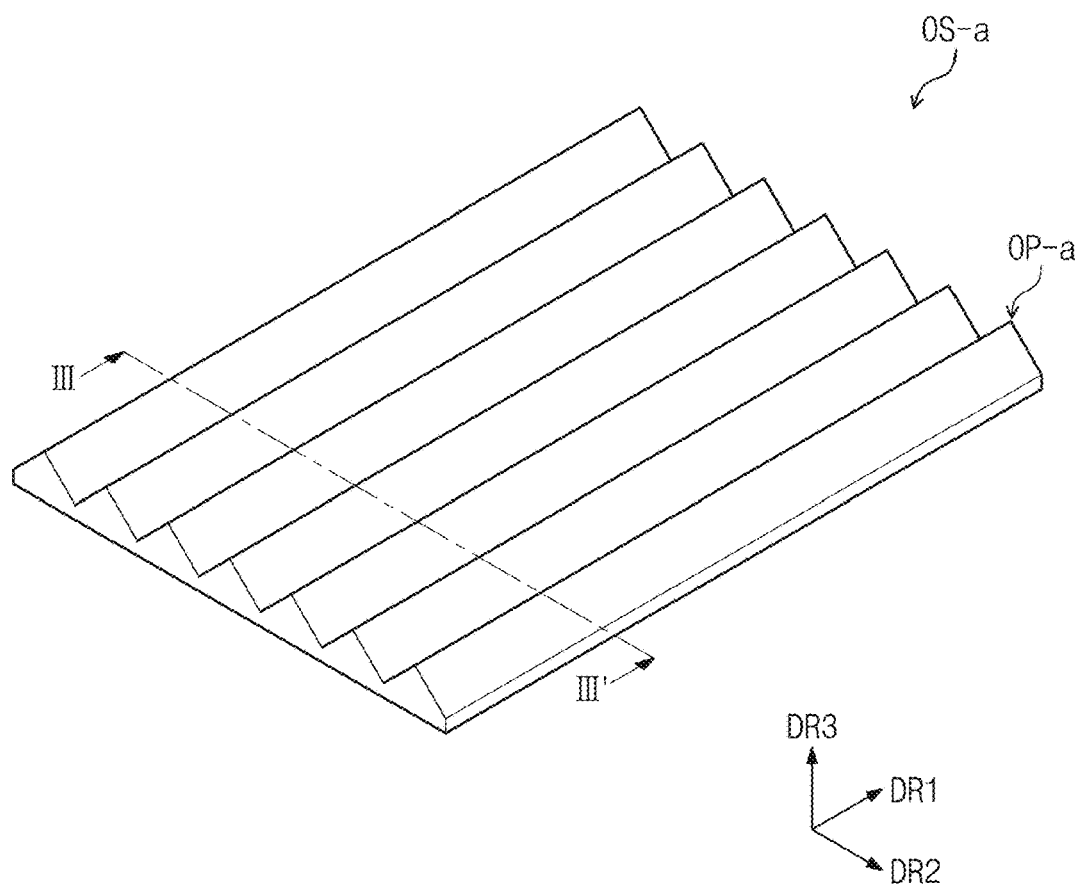
FIGS. 6A, 7A, and 8A are perspective views illustrating exemplary embodiments of a light collecting pattern layer included in a light collecting member, respectively.
Figure 6B:
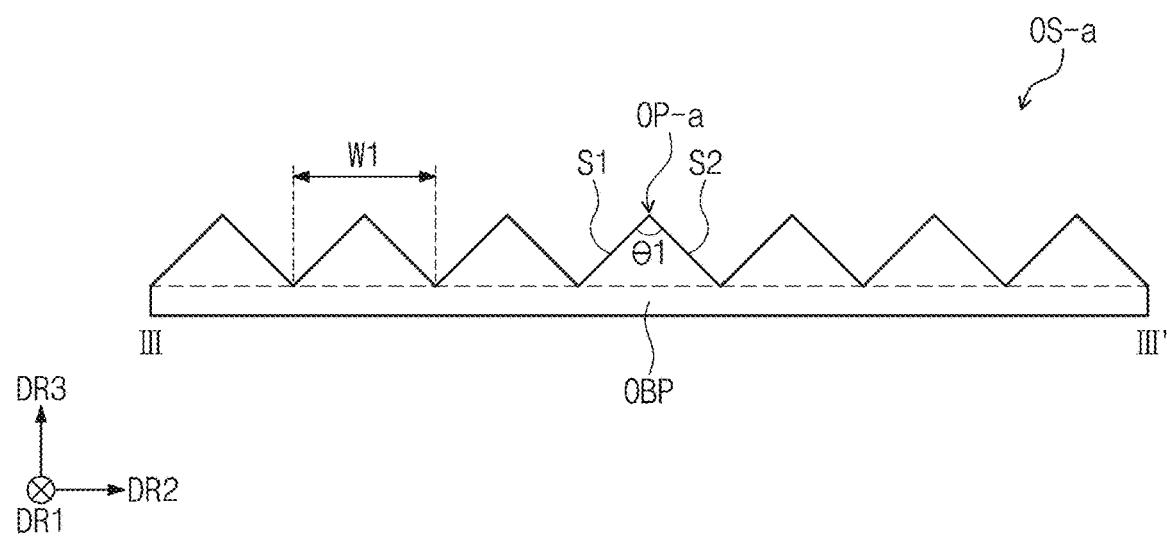
FIGS. 6B, 7B, and 8B are cross-sectional views illustrating a portion of the light collecting pattern layer in FIGS. 6A, 7A, and 8A.
Figure 7A:
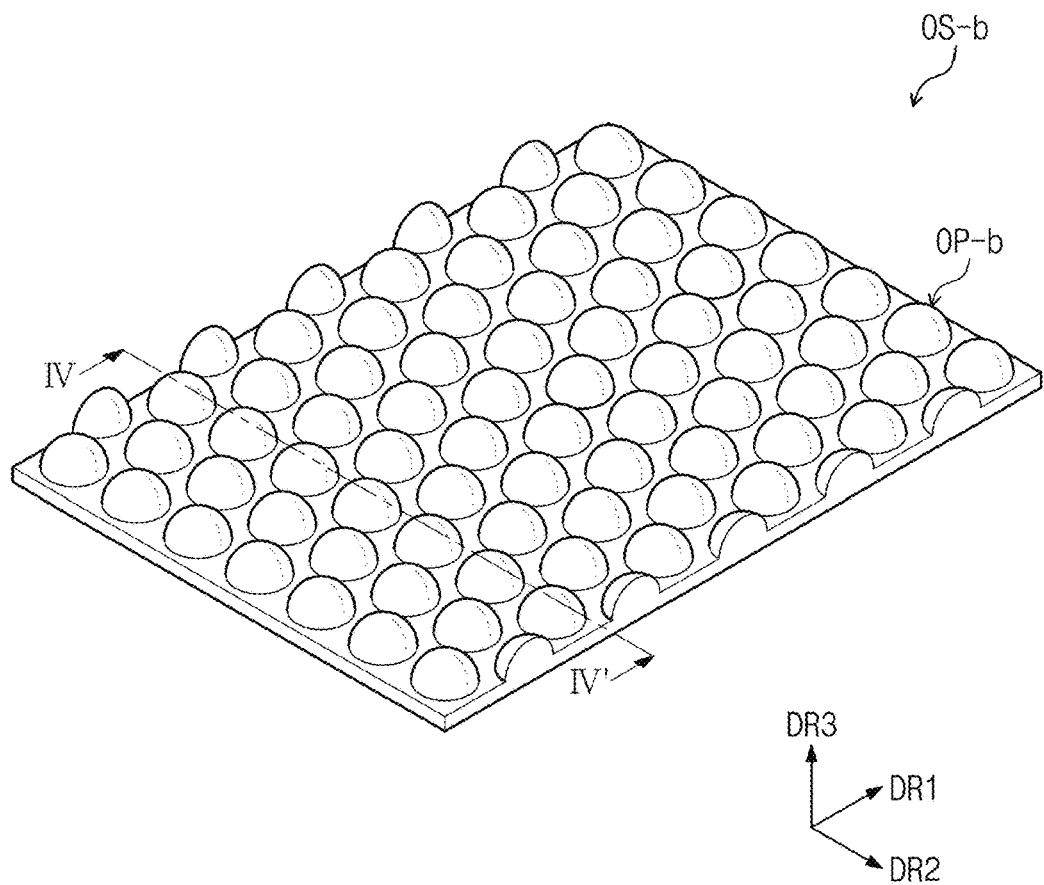
Figure 7B:
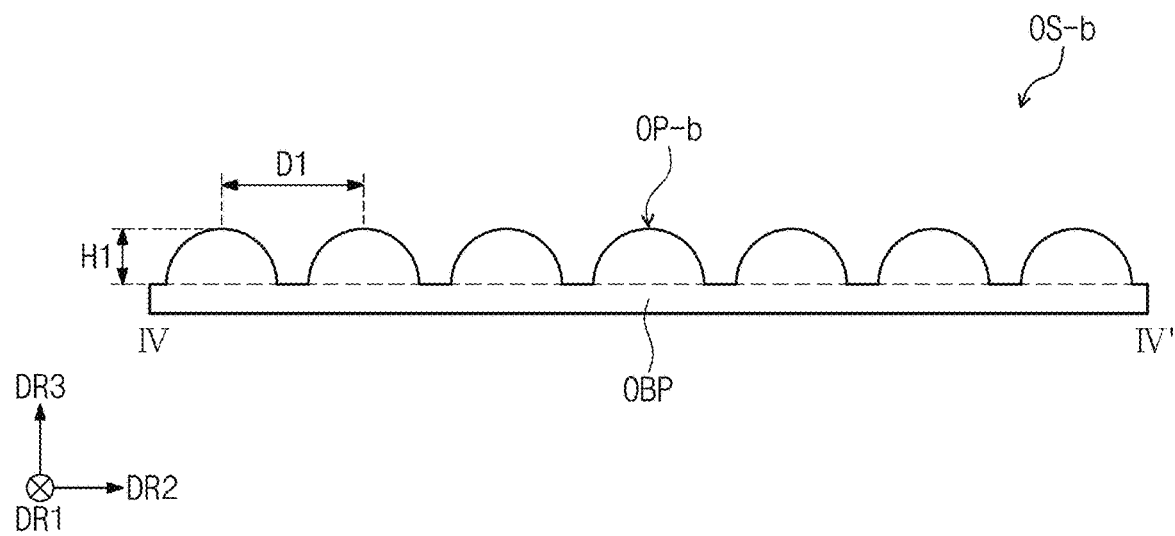
Figure 8A:
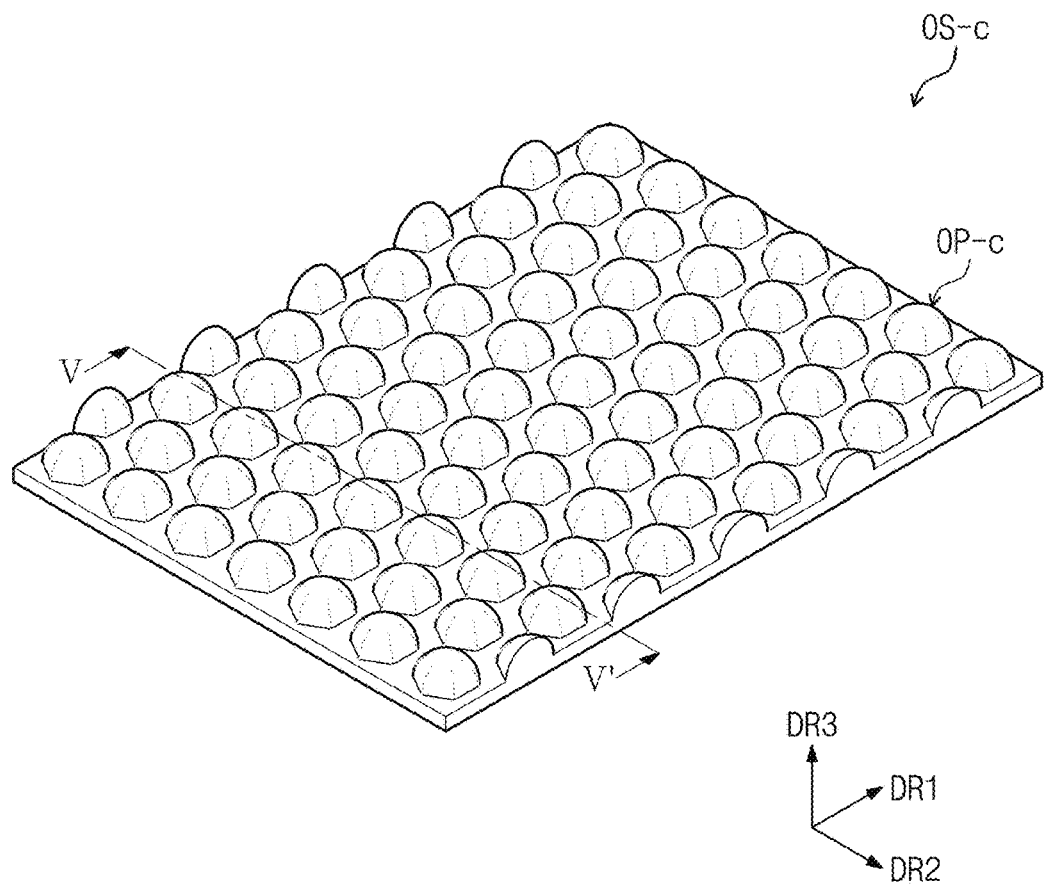
Figure 8B:
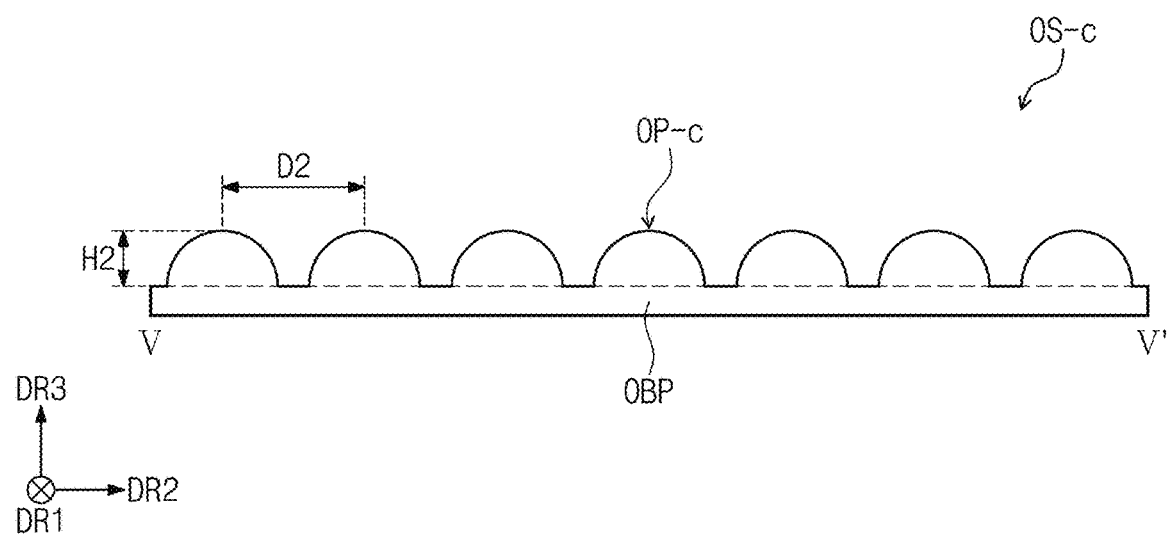

FIGS. 6A to 8B are views illustrating embodiments of the light collecting member LDM. FIGS. 6A, 7A, and 8A are perspective views illustrating light collecting pattern layers included in the light collecting members, respectively, and FIGS. 6B, 7B, and 8B are cross-sectional views illustrating portions of light collecting pattern layers of FIGS. 6A, 7A, and 8A, respectively.

Referring to FIGS. 5 and 6A to 8B, the light collecting member LDM may include a light collecting pattern part OP-a, OP-b, or OP-c. The light collecting pattern part OP-a, OP-b, or OP-c may be a protruding pattern collecting light in a direction toward the liquid crystal layer LCL.

The light collecting member LDM may include a light collecting pattern layer OS-a, OS-b, or OS-c and a second low refraction layer LRL2 disposed on the light collecting pattern layer OS-a, OS-b, or OS-c. The second low refraction layer LRL2 may fill a gap of each of the light collecting patterns OP-a, OP-b, and OP-c of the light collecting pattern layers OS-a, OS-b, and OS-c. The second low refraction layer LRL2 may have a refractive index less than that of the light collecting pattern layer OS-a, OS-b, or OS-c. The light collecting pattern layer OS-a, OS-b, or OS-c may further include a base layer OBP, and the light collecting pattern part OP-a, OP-b, or OP-c may be provided on the base layer OBP.

In an exemplary embodiment, a cross-section parallel to each of the first base substrates BS1 of the light collecting pattern parts OP-a, OP-b, and OP-c may have a circular, elliptical, or polygonal shape, for example. Also, a cross-section perpendicular to each of the first base substrates BS1 of the light collecting pattern parts OP-a, OP-b, and OP-c may have a semi-circular or semi-elliptical shape. In an exemplary embodiment, referring to FIGS. 6A to 8B, the cross-sectional shape of each of the light collecting pattern parts OP-a, OP-b, and OP-c on a plane parallel to a plane defined by the second directional axis DR2 and the third directional axis DR3 may have a semi-circular or semi-elliptical shape or a mixed shape between a triangle or a polygon or between a polygon and a semi-circle or a semi-ellipse, for example. Also, although not shown in the drawing, the cross-sectional shape of each of the light collecting pattern parts OP-a, OP-b, and OP-c on a plane parallel to a plane defined by the first directional axis DR1 and the second directional axis DR2 may have a circular, elliptical, or polygonal shape, for example.

In FIG. 5, the light collecting pattern layer OS may be disposed directly on the color converting member CCM. The light collecting pattern layer OS may be provided by being applied on the second base surface CCM-T that is a top surface of the color converting member CCM. In an alternative exemplary embodiment, the light collecting pattern layer OS may be applied directly on the color converting member CCM by a printing or patterning process.

Unlike the illustration of FIG. 5, the first polarizing layer PL1 in the LCD panel DPb may be disposed on the color converting member CCM, and the light collecting member LDM may be disposed on the first polarizing layer PL1. Here, the first polarizing layer PL1 may be disposed directly on the color converting member CCM while contacting the second base surface CCM-T of the color converting member CCM. In an exemplary embodiment, the first polarizing layer PL1 may be provided directly on the color converting member CCM by a coating process or a deposition and patterning process, for example.

Referring to FIG. 6A, the first light collecting pattern layer OS-a may include a light collecting pattern part OP-a having a prism shape. The first light collecting pattern layer OS-a may include a plurality of light collecting pattern parts OP-a extending in the first direction DR1 and arranged in an adjacent manner in the second directional axis DR2 crossing the first directional axis DR1. The second low refraction layer LRL2 may fill a gap between the light collecting pattern parts OP-a. The second low refraction layer LRL2 may include a material having a refractive index less than that of the light collecting pattern part OP-a. The second low refraction layer LRL2 may have a refractive index equal to or greater than about 1.2 and equal to or less than about 1.4, and the description regarding the first low refraction layer LRL1, which is previously described, may be applied to the second low refraction layer LRL2 in the same manner. The second low refraction layer LRL2 may be disposed on the first light collecting pattern layer OS-a to increase a light collecting efficiency of the light collecting pattern part OP-a.

FIG. 6B illustrates a cross-section taken along line III-III' of FIG. 6A. The light collecting pattern part OP-a of the first light collecting pattern layer OS-a may have an isosceles triangular shape, in which a first side S1 and a second side S2 have the same length as each other, on a cross-section parallel to a plane defined by the second directional axis DR2 and the third directional axis DR3. In an exemplary embodiment, the cross-section of the triangular shape of the light collecting pattern part OP-a may have a bottom side W1 equal to or less than about 70 μm, and an angle θ1 between two sides S1 and S2 may be about 90°, for example. However, the invention is not limited thereto. In an exemplary embodiment, the first light collecting pattern layer OS-a may have various shapes according to an arrangement distance between the light collecting pattern parts OP-a and a height and an angle of a prism mountain that is the light collecting pattern part OP-a, for example.

FIGS. 7A to 8B illustrate embodiments of a light collecting pattern layer including a light collecting pattern part having a lens shape. FIG. 7A is a perspective view illustrating a light collecting pattern layer OS-b according to an exemplary embodiment, and FIG. 7B is a cross-sectional view taken along line IV-IV' of FIG. 7A. Referring to FIGS. 7A and 7B, the light collecting pattern layer OS-b may include a light collecting pattern part OP-b having a semi-circular shape. The light collecting pattern part OP-b may have a shape of a lens protruding in a direction toward the liquid crystal layer LCL (refer to FIG. 5). The light collecting pattern layer OS-b may include a base layer OBP and a plurality of light collecting pattern parts OP-b arranged on the base layer OBP.

The plurality of light collecting pattern parts OP-b may be arranged with a predetermined distance therebetween or arranged in a random manner. When the plurality of light collecting pattern parts OP-b are arranged with a predetermined distance therebetween, a pitch D1 that is a distance between the light collecting pattern parts OP-b may be equal to or greater than about 20 μm and equal to or less than about 70 μm. In an exemplary embodiment, the light collecting pattern parts OP-b may have a height H1 that is equal to or greater than about 10 μm and equal to or less than about 50 μm, for example.

Although the values of the pitch D1 between the light collecting pattern parts OP-b and the height H1 of each of the light collecting pattern parts OP-b are exemplarily provided, the invention is not limited thereto. In an exemplary embodiment, the size and arrangement method of the light collecting part OP-b may be varied in consideration of the size of the LCD panel, a desired light collecting efficiency, or the like, for example.

FIGS. 8A and 8B are views illustrating another exemplary embodiment of a light collecting pattern layer OS-c. FIG. 8A is a perspective view illustrating a light collecting pattern layer OS-c according to an exemplary embodiment, and FIG. 8B is a cross-sectional view taken along line V-V' of FIG. 8A. Referring to FIGS. 8A and 8B, the light collecting pattern layer OS-c may include a base layer OBP and a plurality of light collecting pattern parts OP-c arranged on the base layer OBP. The light collecting pattern part OP-c may have a polygonal shaped bottom surface contacting the base layer OBP and an upper portion of a lens shape that is a semi-sphere. In the exemplary embodiment of FIG. 8A, the light collecting pattern part OP-c may have a bottom surface of a hexagonal shape and be gradually varied into a curved surface in the third directional axis DR3, for example. Referring to FIG. 8B, the light collecting pattern part OP-c may have a semi-circular or semi-elliptical shape on a cross-section parallel to the third directional axis DR3.

Although the light collecting pattern layer is exemplarily illustrated in FIGS. 6A to 8B, the invention is not limited thereto. In the exemplary embodiment of FIG. 5, the light collecting member LDM may include the light collecting pattern parts having various shapes. In an exemplary embodiment, the bottom surface of the light collecting pattern part, which is provided on the base layer OBP, may have a circular or polygonal shape, for example.

The light collecting pattern may have a cross-sectional shape of a circle, an ellipse, or a polygon on a cross-section parallel to the first base substrate BS1 (refer to FIG. 5), i.e., a plane parallel to a plane defined by the first directional axis DR1 and the second directional axis DR2. Also, the light collecting pattern may have a cross-sectional shape of a semi-circle or a semi-ellipse on a cross-section perpendicular to the first base substrate BS1 (refer to FIG. 5), i.e., a plane defined by the first directional axis DR1 and the third directional axis DR3. In an exemplary embodiment, a pitch D2 that is a distance between the light collecting pattern parts OP-c adjacent to each other may be equal to or greater than about 20 μm and equal to or less than about 70 μm, for example. In an exemplary embodiment, the light collecting pattern parts OP-c may have a height H2 equal to or greater than about 10 μm and equal to or less than about 50 μm, for example. In an exemplary embodiment, the pitch D2 between the light collecting pattern parts OP-c may be about 20 μm, and the height of each of the light collecting pattern parts OP-c may be about 50 μm, for example.

Figure 9:
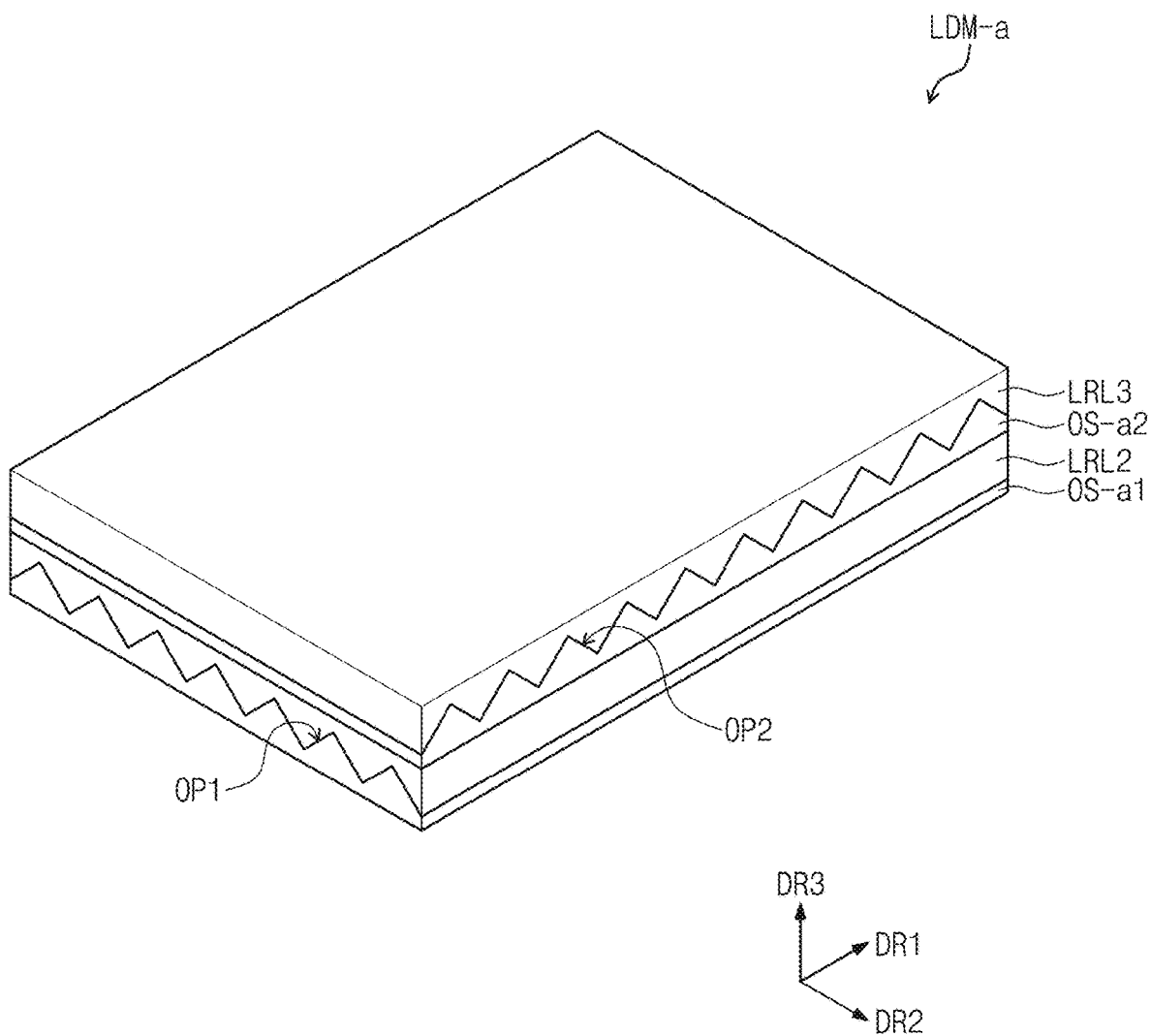
FIG. 9 is a perspective view illustrating an exemplary embodiment of a light collecting member.

FIG. 9 is a perspective view illustrating another exemplary embodiment of the light collecting member. Referring to FIG. 9, a light collecting member LDM-a according to an exemplary embodiment may include a first light collecting pattern layer OS-a1, a second low refraction layer LRL2, a second light collecting pattern layer OS-a2, and a third low refraction layer LRL3.

The first light collecting pattern layer OS-a1 may include a light collecting pattern part OP1 extending in the first directional axis DR1, and the second light collecting pattern layer OS-a2 may include a cross pattern part OP2 extending in the second directional axis DR2 crossing the first directional axis DR1 in a perpendicular manner. The light collecting pattern part OP1 of the first light collecting pattern layer OS-a1 may be a prism pattern extending in the first directional axis DR1 and having a triangular shape on a plane parallel to a plane defined by the second directional axis DR2 and the third directional axis DR3, and the cross pattern part OP2 of the second light collecting pattern layer OS-a2 may be a prism pattern extending in the second directional axis DR2 and having a triangular shape on a plane parallel to a plane defined by the first directional axis DR1 and the third directional axis DR3. That is, the first light collecting pattern layer OS-a1 may have a prism shaped pattern extending in the first directional axis DR1, and the second first light collecting pattern layer OS-a2 may have a prism shaped pattern extending in the second directional axis DR2.

Referring back to FIG. 5, in the LCD panel DPb according to an exemplary embodiment, the light collecting member LDM may be disposed on the color converting member CCM. The light collecting member LDM may be disposed directly on the color converting member CCM. That is, the bottom surface of the light collecting member LDM may contact the second base surface CCM-T that is the top surface of the color converting member CCM.

The first polarizing layer PL1 may be disposed on the light collecting member LDM. Also, the common electrode CE may be disposed on the first polarizing layer PL1.

The common electrode CE is provided to the first substrate SUB1 to form an electric field together with the pixel electrode PE provided to the second substrate SUB2 and control the liquid crystal layer LCL. The common electrode CE may include a transparent conductive material. In an exemplary embodiment, the common electrode CE may include a conductive metal oxide such as indium tin oxide ("ITO"), indium zinc oxide ("IZO"), and indium tin zinc oxide ("ITZO"). The alignment layer (not shown) may be disposed on the common electrode CE.

In describing the LCD panel DPb according to the exemplary embodiment of FIG. 5, the same contents previously described with reference to FIGS. 2 to 4 may be applied to the first base substrate BS1 including the light guide pattern part GP, the first low refraction layer LRL1, the color converting member CCM, and the first polarizing layer PL1 of the first substrate SUB1.

Referring to the illustration of FIG. 5, the second substrate SUB2 may include a second base substrate BS2, a circuit layer CL disposed on a bottom surface BS2-B of the second base substrate BS2, and a color filter layer CFL disposed between the circuit layer CL and the liquid crystal layer LCL. The LCD panel DPb according to an exemplary embodiment may include the second substrate SUB2 including both the circuit layer CL and the color filter layer CFL.

In an exemplary embodiment, the circuit layer CL may include a thin film transistor ("TFT") including a gate electrode, a gate insulation layer, a semiconductor pattern, a source electrode, and a drain electrode. The TFT may be connected to a pixel electrode PE, for example.

The pixel electrode PE may face the common electrode CE with the liquid crystal layer LCL therebetween. The pixel electrode PE may be disposed between the liquid crystal layer LCL and the color filter layer CFL. The pixel electrode PE includes a transparent conductive material. In particular, the pixel electrode PE includes a transparent conductive oxide. In an exemplary embodiment, the transparent conductive oxide may include an ITO, an IZO, and an ITZO, for example.

A low reflective pattern (not shown) may be further provided between the circuit layer CL and the second base substrate BS2. The low reflective pattern (not shown) that includes metal having a low reflectance may block a portion of light transmitting through the second substrate BS2 and provided to the circuit layer CL. In an exemplary embodiment, the low reflective pattern (not shown) may overlap some components of the TFT, for example. As the low reflective pattern (not shown) is disposed, external light may be partially blocked from being reflected by the TFT.

The color filter layer CFL may include a plurality of filter parts CF1 and CF2 allowing light in different wavelength areas to transmit therethrough. A light shielding part BM may be further disposed between the filters adjacent to each other among the plurality of filter parts CF1 and CF2. The light shielding part BM may overlap a boundary between the filter parts CF1 and CF2 adjacent to each other.

The light shielding part BM may be a black matrix. The light shielding part BM may include an organic light shielding material or an inorganic light shielding material, which includes a black pigment or dye. The light shielding part BM may prevent a light leakage phenomenon and divide the filter parts CF1 and CF2 adjacent to each other.

Unlike the illustration of FIG. 5, at least a portion of the light shielding part BM may overlap an edge of each of the filter part CF1 and CF2 adjacent to each other when viewed from a plane. That is, at least a portion of the light shielding part BM may overlap an edge of each of the filter parts CF1 and CF2 adjacent to each other on a plane defined by the first directional axis DR1 and the third directional axis DR3.

Although the two filter parts CF1 and CF2 adjacent to each other are illustrated in FIG. 5, the invention is not limited thereto. In an exemplary embodiment, the color filter layer CFL may include three or more filter parts allowing light in different wave length areas to transmit therethrough, for example. In an exemplary embodiment, the color filter layer CFL may include a red filter part, a green filter part, and a blue filter part, or the color filter layer CFL may include a red filter part, a green filter part, a blue filter part, and a white filter part, for example. However, the invention is not limited thereto. The filter parts allowing light in different wavelength areas to transmit therethrough, which is included in the color filter layer CFL, may be combined in various arrangement sequences.

Also, although the two filter parts CF1 and CF2 adjacent to each other partially overlap each other in the third directional axis DR3 that is a thickness direction, the invention is not limited thereto. In an exemplary embodiment, the two filter parts CF1 and CF2 adjacent to each other may be arranged while being spaced apart from each other, for example. In this case, the light shielding part BM may be disposed between the spaced filter parts CF1 and CF2 or have at least a portion overlapping an edge of each of the spaced filter parts.

In describing the second substrate SUB2 of FIG. 5, the contents previously described in the LCD panel DPa of FIG. 2 may be applied to the second base substrate BS2 and the second polarizing layer PL2 in the same manner.

Figure 10:
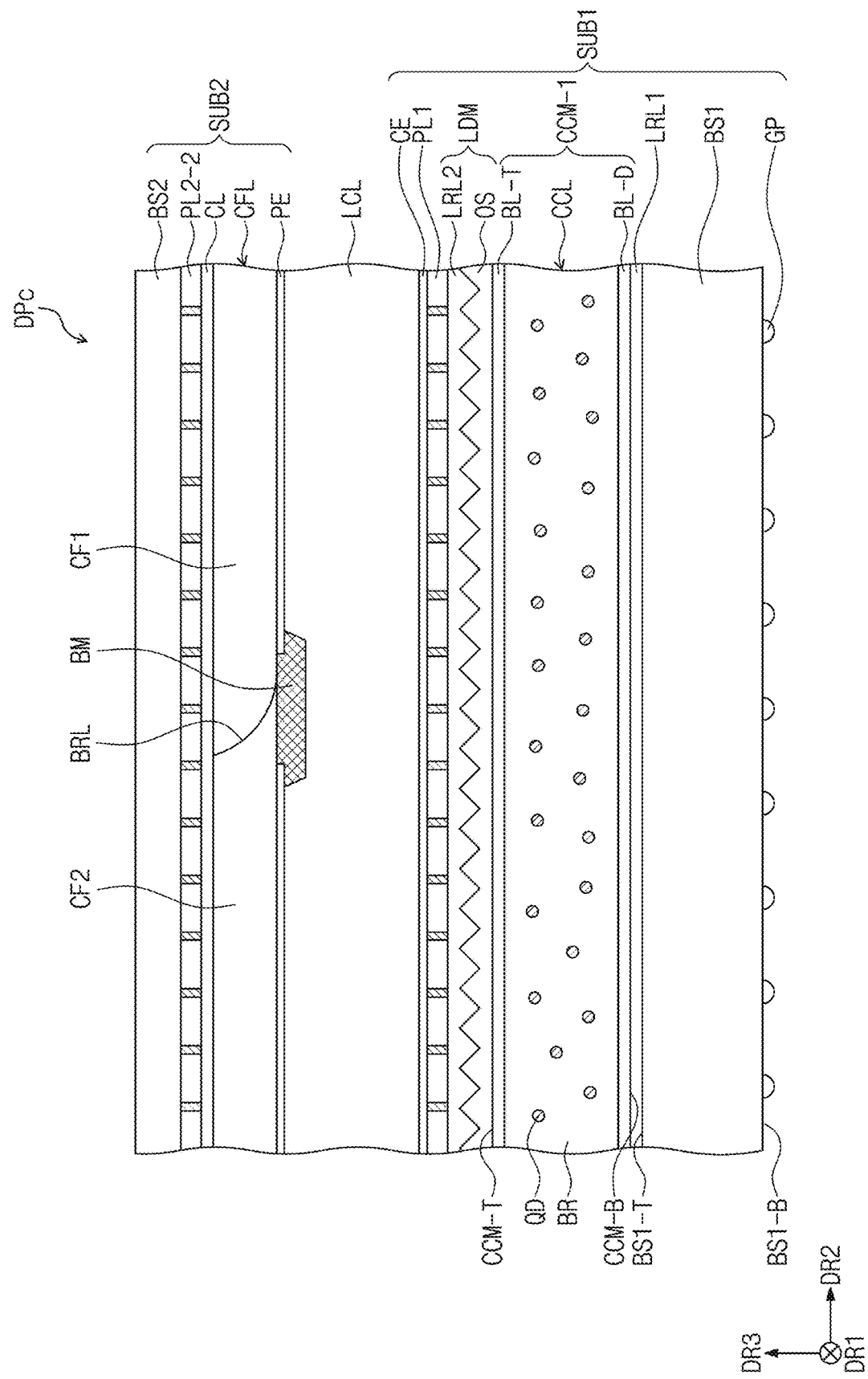
FIG. 10 is a cross-sectional view illustrating an exemplary embodiment of an LCD panel.

FIG. 10 is a cross-sectional view illustrating a liquid crystal panel DPc according to an exemplary embodiment. The liquid crystal panel DPc according to an exemplary embodiment in FIG. 10 is different from the LCD panel DPa according to the exemplary embodiment of FIG. 5 in configuration of a color converting member CCM-1 and arrangement position of a second polarizing layer PL2-2. Hereinafter, in describing the liquid crystal panel according to the exemplary embodiment of FIG. 10, contents overlapping those described previously in FIGS. 1 to 9 will not be described again, and only different points will be mainly described.

The color converting member CCM-1 may further include at least one barrier layer BL-D or BL-T. The at least one barrier layer BL-D or BL-T may be disposed adjacent to a first base surface CCM-B or a second base surface CCM-T.

In an exemplary embodiment, the color converting member CCM-1 according to the exemplary embodiment of FIG. 10 may include a first barrier layer BL-D contacting the first low refraction layer LRL1 and a second barrier layer BL-T contacting the light collecting member LDM, for example. In this case, the first base surface CCM-B of the color converting member CCM-1 may be one surface of the first barrier layer BL-D contacting the first low refraction layer LRL1, and the second base surface CCM-T of the color converting member CCM-1 may be one surface of the second barrier layer BL-T contacting the light collecting member LDM. That is, in an exemplary embodiment, one surface of the first barrier layer BL-D included in the color converting member CCM-1 may be a bottommost surface of the color converting member CCM-1, which is exposed to the outside and contacts another member adjacent thereto, and one surface of the second barrier layer BL-T may be a topmost surface of the color converting member CCM-1, which is exposed to the outside and contacts another member adjacent thereto.

The color converting member CCM-1 may include a color converting layer CCL including a quantum dot QD and a base resin BR and the barrier layer BL-D or BL-T protecting the color converting layer CCL. In an exemplary embodiment, the color converting member CCM-1 may include the color converting layer CCL and at least one barrier layer BL-D or BL-T disposed on at least one surface of the top and bottom surfaces of the color converting layer CCL, for example.

The barrier layer BL-D or BL-T serves to block moisture and/or oxygen (hereinafter, referred to as "moisture/oxygen") from being introduced. The barrier layer BL-D or BL-T may include at least one inorganic layer. That is, the barrier layer BL-D or BL-T may include a material including an inorganic material. In an exemplary embodiment, the barrier layer BL-D or BL-T may include a silicon nitride, an aluminum nitride, a zirconium nitride, a titanium nitride, a hafnium nitride, a tantalum nitride, a silicon oxide, an aluminum oxide, a titanium oxide, a tin oxide, a cerium oxide, a silicon oxynitride, or a metal thin-film securing a light transmittance, for example. The barrier layer BL-D or BL-T may further include an organic layer. The barrier layer BL-D or BL-T may include a single layer or a plurality of layers.

Referring to FIG. 10, the color converting member CCM-1 may include the first barrier layer BL-D contacting the first low refraction layer LRL1 and the second barrier layer BL-T contacting the light collecting member LDM disposed on the color converting member CCM-1. Although each of the first and second barrier layers BL-D and BL-T is illustrated as a single layer in FIG. 10, the invention is not limited thereto. In an exemplary embodiment, each of the first and second barrier layers BL-D and BL-T may include a plurality of layers, for example.

When the first barrier layer BL-D includes a plurality of layers, the first barrier layer BL-D may include a plurality of inorganic layers or both an inorganic layer and an organic layer. Also, when the second barrier layer BL-T includes a plurality of layers, the second barrier layer BL-T may include a plurality of inorganic layers or both an inorganic layer and an organic layer.

Although not shown in the drawing, a barrier layer is further disposed on the light collecting member LDM. The barrier layer disposed on the light collecting member LDM may also include an inorganic layer or an organic layer. In an exemplary embodiment, an inorganic layer and an organic layer are alternately disposed on the light collecting member LDM, for example.

In the exemplary embodiment of FIG. 10, the second polarizing layer PL2-2 may be disposed between the liquid crystal layer LCL and the color filter layer CFL or between the color filter layer CFL and the second base substrate BS2. That is, the second polarizing layer PL2-2 may be an in-cell type polarizing layer disposed between the liquid crystal layer LCL and the second base substrate BS2. In an exemplary embodiment, the second polarizing layer PL2-2 may be a coating type polarizer or a wire-grid type polarizer, for example.

Figure 11A:
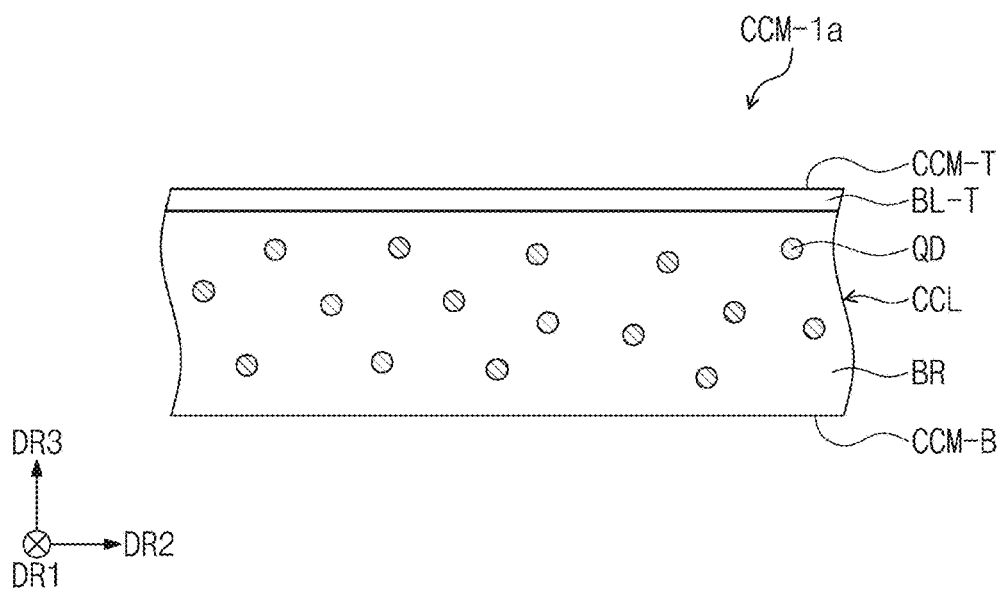
FIGS. 11A and 11B are cross-sectional views illustrating an exemplary embodiment of a color converting member.
Figure 11B:
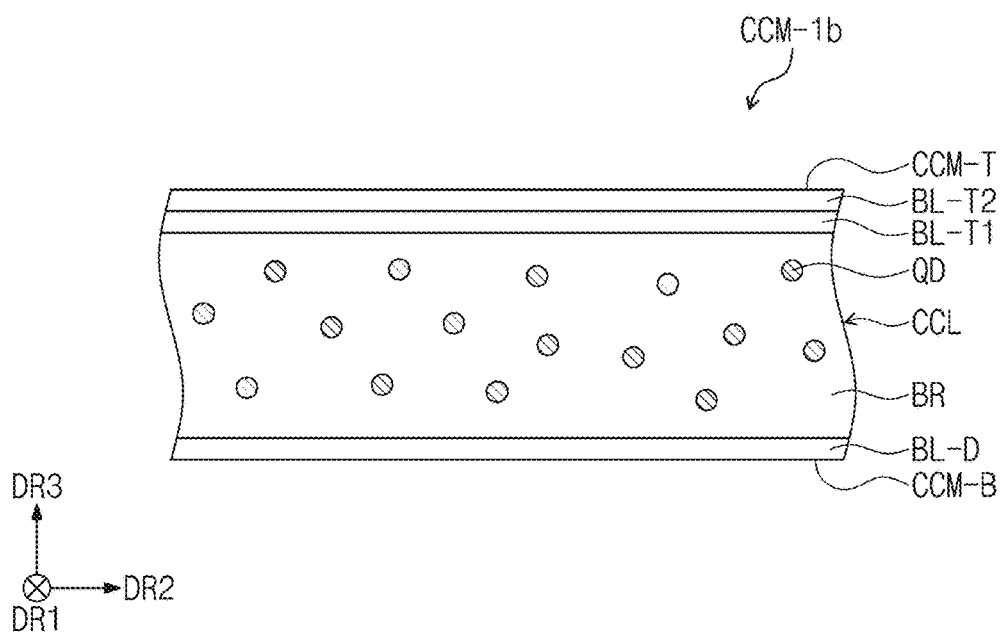

FIGS. 11A and 11B are cross-sectional views illustrating embodiments of the color converting member. The exemplary embodiment of a color converting member CCM-1a in FIG. 11A is different from the color converting member CCM-1 in FIG. 10 in that the color converting member CCM-1a includes only a second barrier layer BL-T adjacent to a second base surface CCM-T that is a top surface. The color converting member CCM-1a may include the color converting layer CCL and the second barrier layer BL-T. In this case, the second base surface CCM-T of the color converting member CCM-1a may be an exposed top surface of the second barrier layer BL-T.

The exemplary embodiment of a color converting member CCM-1b in FIG. 11B is different from the color converting member CCM-1 in FIG. 10 in that the color converting member CCM-1b includes a first sub-barrier layer BL-T1, and a second sub-barrier layer BL-T2. The color converting member CCM-1b may include a color converting layer CCL, a first barrier layer BL-D, a first sub-barrier layer BL-T1, and a second sub-barrier layer BL-T2. In this case, the second base surface CCM-T of the color converting member CCM-1b may be an exposed top surface of the second sub-barrier layer BL-T2.

Figure 12:
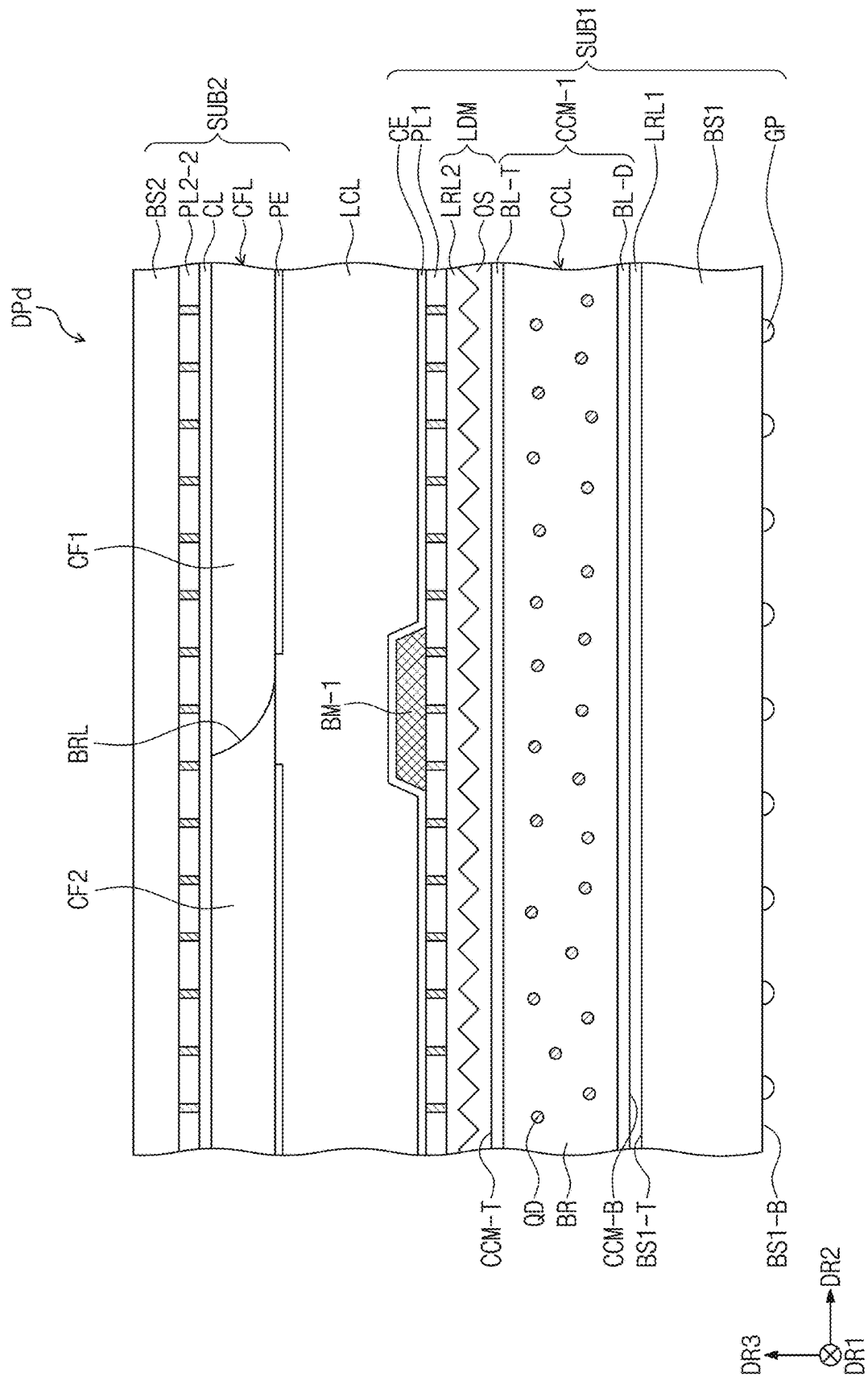
FIGS. 12 and 13 are cross-sectional views illustrating an exemplary embodiment of an LCD panel.
Figure 13:
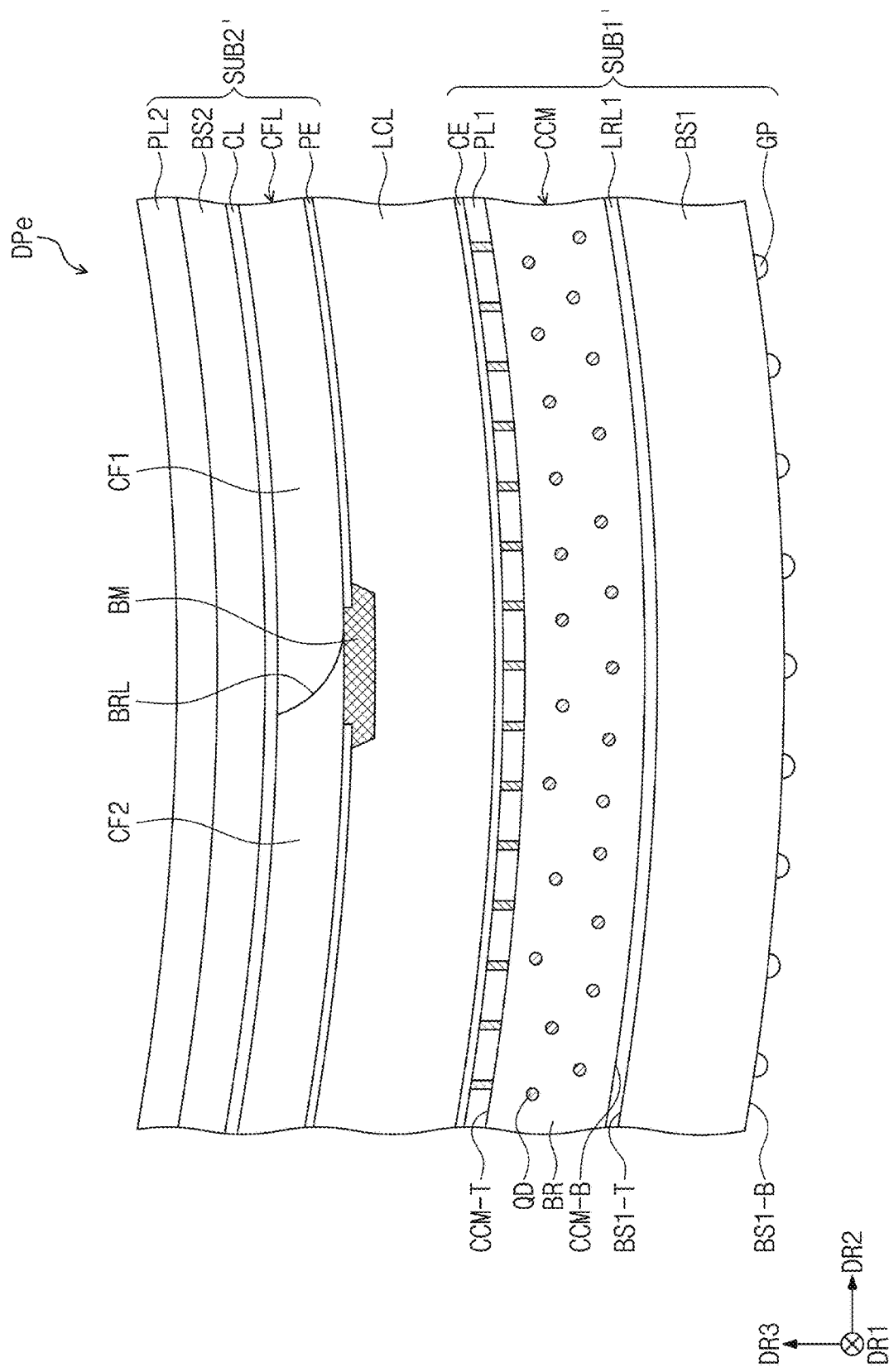

FIGS. 12 and 13 are cross-sectional view of an LCD panel according to an exemplary embodiment. Hereinafter, in describing the LCD panel according to embodiments of FIGS. 12 and 13, the contents described in FIGS. 1 to 10 may be applied to each of components having like reference numerals in the same manner. Hereinafter, in describing FIGS. 12 and 13, the contents overlapping those described previously in FIGS. 1 to 11 may not be described again, and different points will be mainly described.

Referring to FIG. 12, a first substrate SUB1 of an LCD panel DPd according to an exemplary embodiment may include a first base substrate BS1, a color converting member CCM-1, a light collecting member LDM, and a first polarizing layer PL1, which are sequentially laminated. Also, the first substrate SUB1 may include a common electrode CE disposed adjacent to a liquid crystal layer LCL. The first base substrate BS1 may include a light guide pattern part GP.

In the exemplary embodiment of FIG. 12, the first substrate SUB1 may further include a light shielding part BM-1 disposed on the first polarizing layer PL1. The light shielding part BM-1 may overlap a boundary BRL between filter parts CF1 and CF2 adjacent to each other of a color filter layer CFL included in the second substrate SUB2. Also, the common electrode CE may be disposed on the first polarizing layer PL1 while covering the light shielding part BM.

The second substrate SUB2 may include a second base substrate BS2, and a circuit layer CL, a color filter layer CFL, and a pixel electrode PE, which are sequentially arranged in a direction toward the liquid crystal layer LCL. The pixel electrode PE may face the common electrode CE with the liquid crystal layer LCL therebetween.

Referring to the illustration of FIG. 12, although a second polarizing layer PL2-2 included in the second substrate SUB2 may be disposed between the circuit layer CL and the second base substrate BS2, the invention is not limited thereto. In another exemplary embodiment, the second polarizing layer PL2-2 may be disposed between the liquid crystal layer LCL and the color filter layer CFL or between the color filter layer CFL and the second base substrate BS2. The second polarizing layer PL2-2 may be a coating type polarizer or a wire-grid type polarizer.

Although the exemplary embodiments of the LCD panels in FIGS. 2, 5, 10, and 12 are exemplarily provided, the configuration of each of the first substrate SUB1 and the second substrate SUB2 may be varied within the scope of an exemplary embodiment of the invention.

As the base substrate including the light guide pattern part, the color converting member, and the polarizing layer are provided in an integrated manner, and the integrated substrate is used as the substrate of the LCD panel, the above-described LCD panel according to an exemplary embodiment may have display quality equal to or greater than that when an optical member is provided separately from a display panel, and the thin-type LCD panel is realized. Also, as the color converting member including the quantum dot and the light collecting member including the light collecting pattern layer are sequentially applied on the first base substrate to provide the color converting member and the light collecting member in an in-cell type, a reliability limitation generated when the optical member is exposed to an external environment may be resolved.

Also, the LCD panel according to an exemplary embodiment may sequentially provide the first low refraction layer, the color converting member, and the light collecting members on the first base substrate, so as to minimize a module process of coupling the display panel to the optical members, thereby increasing productivity when the LCD panel is manufactured.

FIG. 13 is a cross-sectional view illustrating an LCD panel according to an exemplary embodiment, and an LCD panel DPe according to an exemplary embodiment may include a bent first substrate SUB1' and a bent second substrate SUB2'.

That is, the LCD panel DPe according to an exemplary embodiment of FIG. 13 may be a curved LCD panel. The LCD panel DPe according to an exemplary embodiment may be bent with a predetermined curvature/curvature radius. The LCD panel DPe according to an exemplary embodiment may be flexible or rigid.

Although the LCD panel DPe according to an exemplary embodiment has a concavely bent shape when viewed from the second substrate SUB2' that is a display surface for displaying an image in FIG. 13, the invention is not limited thereto. In an exemplary embodiment, unlike the illustration of FIG. 13, the LCD panel DPe according to an exemplary embodiment may have a protruding shape when viewed from the second substrate SUB2', for example.

The first substrate SUB1' and the second substrate SUB2' may be bent and have curvature radii different from each other. In an exemplary embodiment, although the curvature radius of the first substrate SUB1' may be less than that of the second substrate SUB2', for example, the invention is not limited thereto.

In FIG. 13, the first substrate SUB1' may include a first base substrate BS1 including a light guide pattern part GP, a first low refraction layer LRL1, a color converting member CCM, a first polarizing layer PL1, and a common electrode CE. The first base substrate BS1, the first low refraction layer LRL1, the color converting member CCM, the first polarizing layer PL1, and the common electrode CE, which are components included in the first substrate SUB1', may be bent in the same shape.

Although not shown in the drawing, the first substrate SUB1' may further include the light collecting member LDM (refer to FIG. 5), and the color converting member CCM may further include the barrier layer BL-D or BL-T (refer to FIG. 10).

The second substrate SUB2' may include a second base substrate BS2, a second polarizing layer PL2 disposed on the second base substrate BS2, and a circuit layer CL, a color filter layer CFL, and a pixel electrode PE, which are sequentially arranged in a direction from the base substrate BS2 to the liquid crystal layer LCL. Also, the second substrate SUB2' may include a light shielding part BM overlapping a boundary BRL between filter parts CF1 and CF2, which are adjacent to each other, of the color filter layer CFL.

However, the invention is not limited thereto. In an exemplary embodiment, the configuration of the first substrate SUB1' and the second substrate SUB2' in the LCD panel DPe according to the exemplary embodiment of FIG. 13 may be applied by variously combining the configuration of the first substrate SUB1 and the second substrate SUB2 of the liquid crystal panel described in FIGS. 2, 5, 10, and 12, for example.

The liquid crystal layer LCL in the LCD panel DPe according to the exemplary embodiment of FIG. 13 may include a vertical alignment liquid crystal molecule. That is, the LCD panel DPe according to an exemplary embodiment may be realized in a vertical alignment mode, a super vertical alignment ("SVA") mode, and a super patterned vertical alignment ("S-PVA") mode, for example.

The LCD panel DPe according to the exemplary embodiment of FIG. 13 may include the first base substrate BS1 including the light guide pattern part GP, the color converting member CCM, and the first polarizing layer PL1 in an integrated manner to reduce a total thickness of the display panel while minimizing deformation of each component included in the first substrate SUB1' and the second substrate SUB2' even when the first substrate SUB1' and the second substrate SUB2' are bent, thereby realizing a curved LCD panel.

Figure 14:
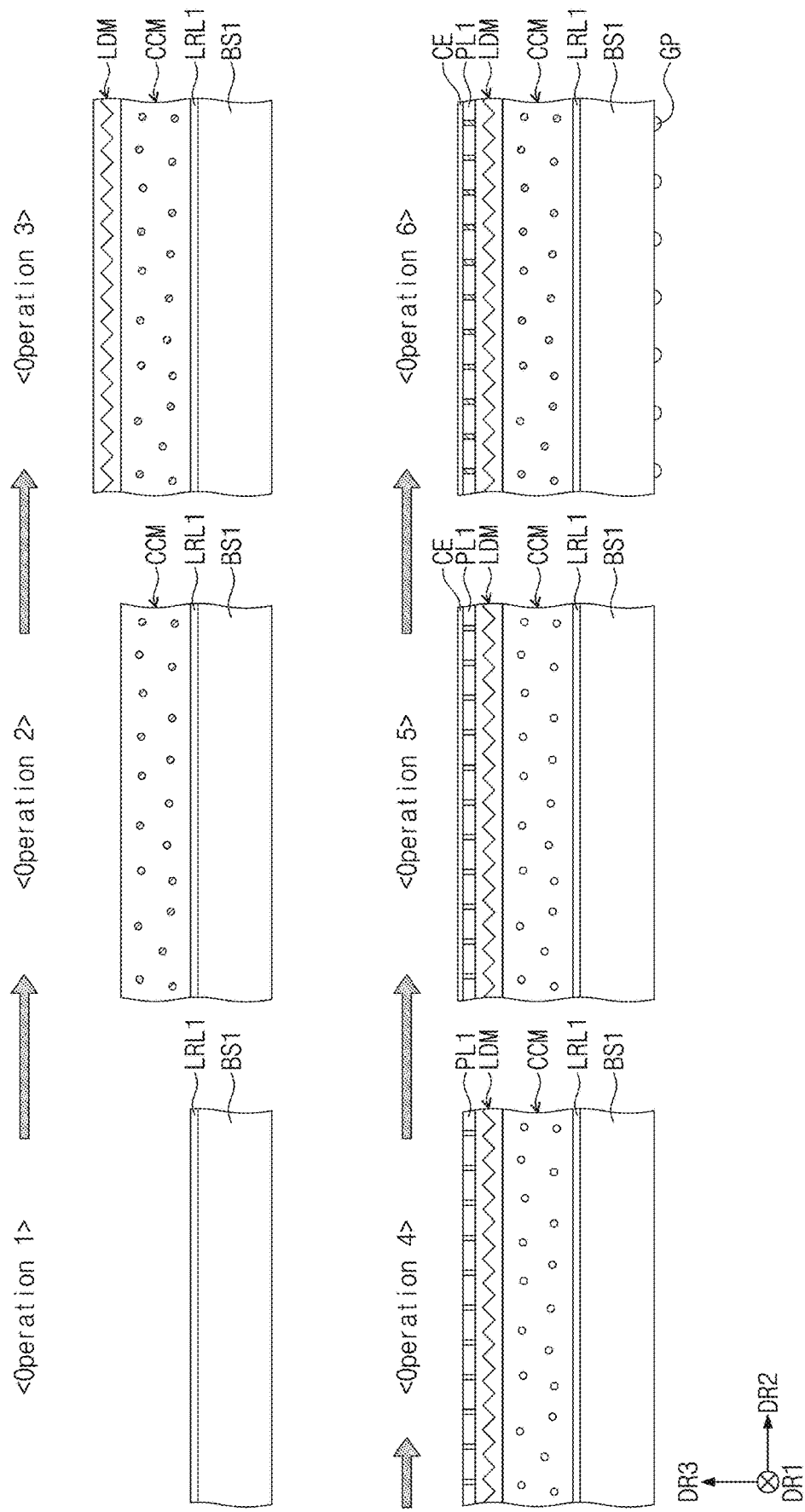
FIG. 14 is a schematic view illustrating an exemplary embodiment of a manufacturing process of a first substrate of an LCD panel.

FIG. 14 is a schematic view illustrating manufacturing operations of the first substrate SUB1 of the LCD panel. Although Operation 1 to Operation 6 in FIG. 14 show the manufacturing operations of the first substrate SUB1 in a sequential manner, the invention is not limited thereto. In an exemplary embodiment, Operation 3 and Operation 4 may be switched in sequence. Also, Operation 6 for forming the light guide pattern part GP may be per provided before or after Operation 1, for example.

Referring to Operation 1, firstly, the first low refraction layer LRL1 is provided directly on the first base substrate BS1. In an exemplary embodiment, the first low refraction layer LRL1 may be disposed directly on the first base substrate BS1 and have a thickness of about 0.1 μm to about 10 μm, for example.

Thereafter, Operation 2 shows an operation of forming the color converting member CCM. The color converting member CCM may be provided on the first low refraction layer LRL1. The color converting member CCM may be a color converting layer including a quantum dot. The color converting member CCM may include at least one quantum dot and be disposed directly on the first low refraction layer LRL1. In an exemplary embodiment, the color converting member CCM may have a thickness of about 0.5 μm to about 100 μm, for example. The color converting member CCM may be provided on the first low refraction layer LRL1 through a coating process.

When color converting member CCM further includes a barrier layer, the barrier layer may be a base surface of the color converting member CCM, which contacts the first low refraction layer. The barrier layer may include an inorganic layer or an organic layer. The barrier layer may be a single layer or a multi-layers. The operation of providing the barrier layer may be performed between Operation 1 and Operation 2 and between Operation 2 and Operation 3.

Operation 3 is an operation of providing the light collecting member LDM. The operation of providing the light collecting member LDM may form the light collecting member directly on the color converting member CCM by a coating or patterning method or provide the light collecting member LDM in an optical sheet type on the color converting member CCM.

Operation 4 is an operation of providing the first polarizing layer PL1. The first polarizing layer PL1 may be provided directly on the light collecting member LDM. The first polarizing layer PL1 may be a coating-type polarizing layer or a wire-grid polarizing layer. The first polarizing layer PL1 may be disposed directly on the color converting member CCM, and, in this case, the light collecting member LDM may be disposed on the first polarizing layer PL1 after the first polarizing layer PL1 is provided.

Operation 5 shows an operation of forming the common electrode CE. In an exemplary embodiment, the common electrode CE may be provided by depositing ITO, IZO, or the like, for example.

Operation 6 shows an operation of forming the light guide pattern part GP. The light guide pattern part GP may be provided by directly patterning the bottom surface of the first base substrate BS1 or provided on the base substrate BS1 by a transfer process.

Figure 15:
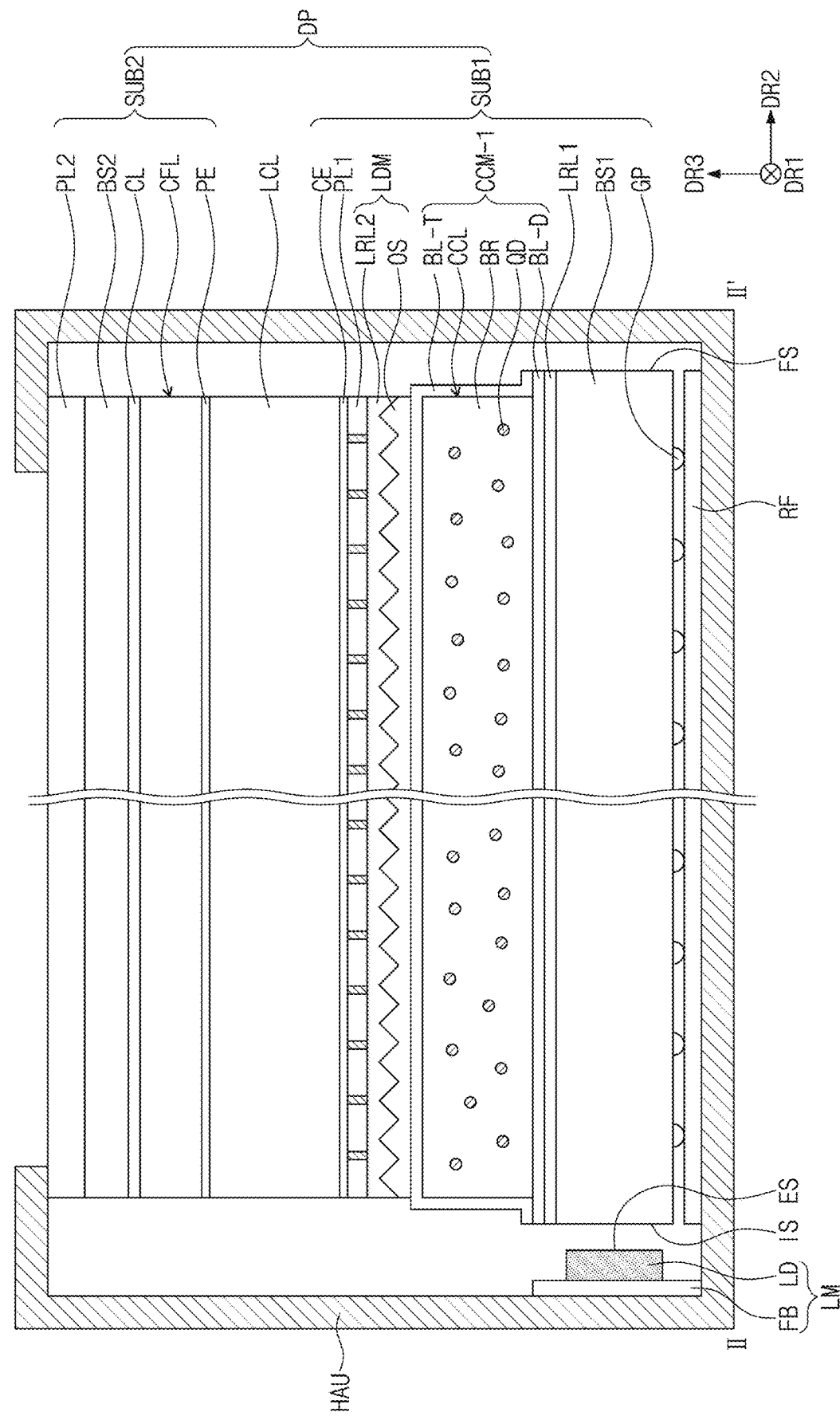
FIG. 15 is a cross-sectional view of an LCD device taken along line II-II' of FIG. 1.

Hereinafter, an LCD device according to an exemplary embodiment will be described with reference to the drawings. FIG. 15 is a cross-sectional view illustrating an LCD device according to an exemplary embodiment. The LCD panel DP included in the LCD device DD according to the exemplary embodiment of FIG. 15 may correspond to the above-described LCD panel according to an exemplary embodiment, and the LCD panel according to the exemplary embodiments of FIGS. 1 to 13 may be also applied the same besides the illustration of FIG. 15. The cross-sectional view of the LCD device DD according to the exemplary embodiment of FIG. 15 may be a cross-sectional view taken along line II-II' of FIG. 1.

The LCD device DD according to an exemplary embodiment may include a light source member LM and an LCD panel DP. Also, the LCD device DD according to an exemplary embodiment may further include a housing HAU accommodating the light source member LM and the LCD panel DP.

The LCD panel DP includes a first substrate SUB1, and a second substrate SUB2, which face each other, with a liquid crystal layer LCL disposed therebetween. The first substrate SUB1 may include a first base substrate BS1 including a light guide pattern part GP, a low refraction layer LRL1, a color converting member CCM-1, a light collecting member LDM, a first polarizing layer PL1, and a common electrode CE. Also, the LCD device DD according to the exemplary embodiment of FIG. 15 may include a second base substrate BS2, a second polarizing layer PL2, a circuit layer CL, a color filter layer CFL, and a pixel electrode PE. The above-described description regarding the LCD device according to an exemplary embodiment may be applied to the configuration of each of the first substrate SUB1 and the second substrate SUB2 in the same manner.

Referring to FIG. 15, in an exemplary embodiment, the color converting member CCM-1 may include first and second barrier layers BL-D and BL-T, and the second barrier layer BL-T may be disposed to cover a side surface of a color converting layer CCL. In an exemplary embodiment, the second barrier layer BL-T may serve as an encapsulation layer sealing the color converting layer CCL, for example.

The light source member LM may provide light to the LCD panel DP. The light source member LM may be disposed at one side of the LCD panel DP. The light source member LM may include a circuit board FB and a light emitting diode package LD disposed on the circuit board FB. The light emitting diode package LD may have a light emitting surface ES facing a side surface of the first substrate SUB1. In an exemplary embodiment, the light emitting surface ES of the light emitting diode package LD in the LCD device DD according to an exemplary embodiment may face a side surface of a first base substrate BS1, for example. The side surface of the first base substrate BS1, which faces the light emitting surface ES, may be a light incident surface IS.

The circuit board FB may provide a power to the light emitting diode package LD disposed (e.g., mounted) thereto. In an exemplary embodiment, the circuit board FB may provide a dimming signal and a driving voltage to the disposed (e.g., mounted) light emitting diode packages LD, for example.

The circuit board FB may include at least one insulation layer (not shown) and at least one circuit layer (not shown). In an exemplary embodiment, the circuit board FB may be a metal core printed circuit board ("MCPCB"), for example.

A plurality of light emitting diode packages LD may be disposed on the circuit board FB. The plurality of light emitting diode packages LD may emit light in the same wavelength area. In an alternative exemplary embodiment, the light source member LM may include a plurality of light emitting diode packages LD that emit light in different wavelength areas. Also, light in wavelength areas different from each other may be mixed and emitted from one light emitting diode package LD.

Also, the display device according to the exemplary embodiment of FIG. 15 may further include a reflective member RF. The reflective member RF may be disposed below the first substrate SUB1. The reflective member RF may face the light guide pattern part GP. The reflective member RF may include a reflective film or a reflective coating layer. The reflective member RF reflects light emitted from a bottom surface of the first substrate SUB1 to allow the light to be re-incident into the first base substrate BS1.

Figure 16A:
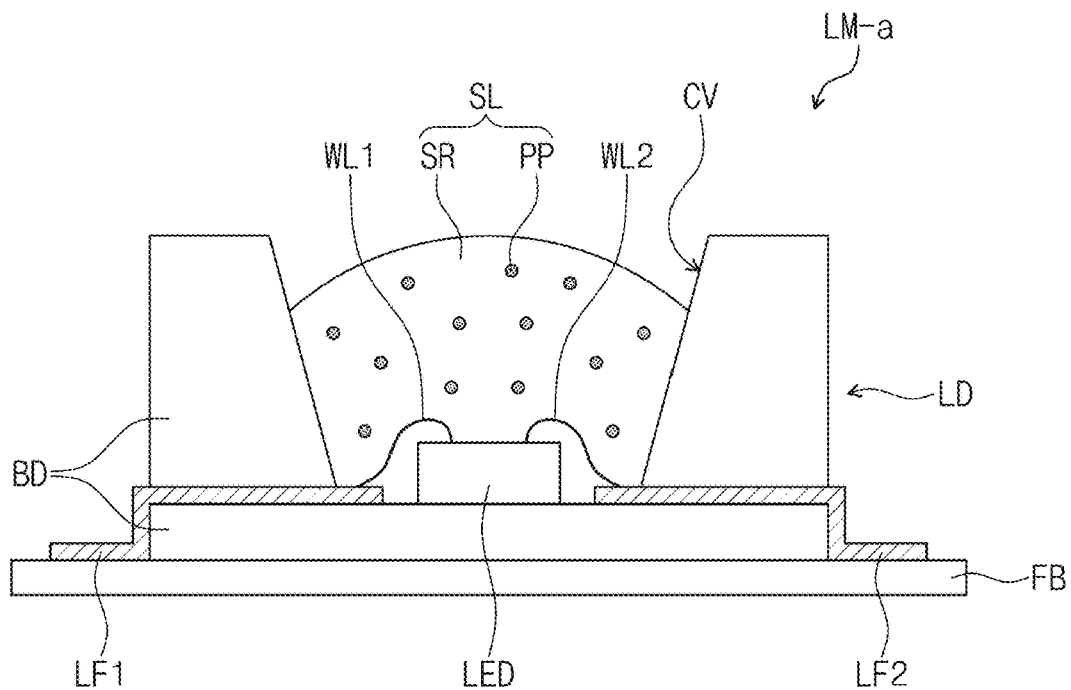
FIGS. 16A and 16B are cross-sectional views illustrating an exemplary embodiment of a light source member.
Figure 16B:
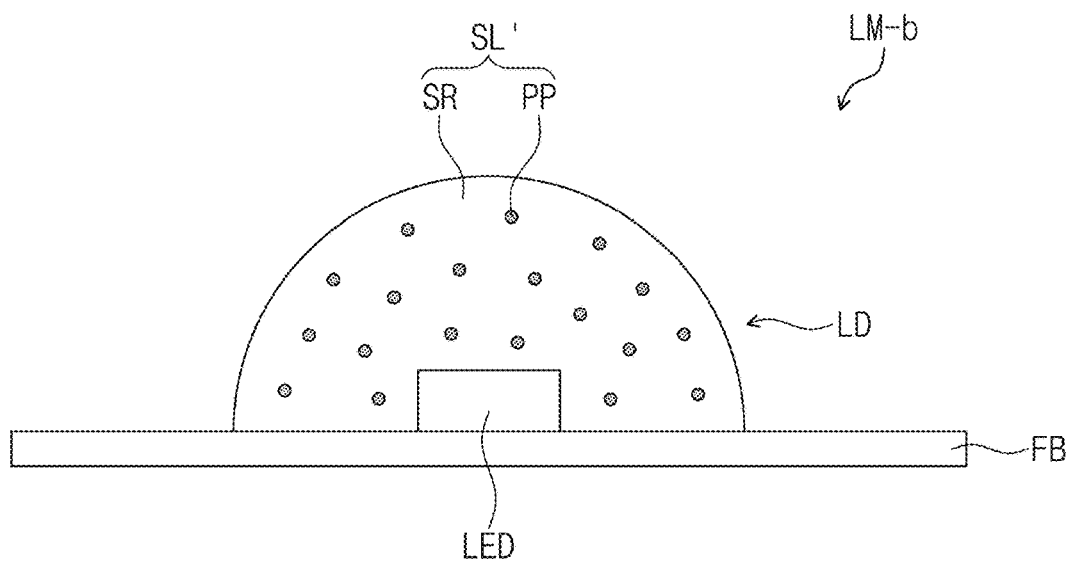

FIGS. 16A and 16B are cross-sectional views illustrating embodiments of the light source member. Referring to FIG. 16A, a light emitting diode package LD included in the light source member LM-a may include a light emitting diode LED, a pair of lead frames LF1 and LF2, and a body part BD.

The light emitting diode LED, which generates light in response to a voltage provided from the circuit board FB, may have a structure in which n-type semiconductor layer, an active layer, and a p-type semiconductor layer are sequentially laminated and emit light when a driving voltage is applied while an electron and a hole move to be re-coupled to each other.

The body part BD may allow the light emitting diode LED to be disposed (e.g., mounted) thereto and fix the first and second lead frames LF1 and LF2. In an exemplary embodiment, the body part BD may include a material such as a polymer resin. Also, a cavity CV may be defined in the body part BD, and the cavity CV may be a space in which the light emitting diode LED is disposed (e.g., mounted).

The light emitting diode LED is disposed inside the cavity CV of the body part BD, and a sealing part SL surrounding the light emitting diode LED and filling the cavity CV is disposed in the cavity CV. The sealing part SL may protect the light emitting diode LED. Also, the sealing part SL may include a sealing resin SR and a phosphor PP depending on a case-to-case basis. In an exemplary embodiment, the sealing resin SR may include an epoxy resin or an acrylic resin, for example.

Although the phosphor PP may include a red phosphor, a yellow phosphor, or a green phosphor, the invention is not limited thereto. In an exemplary embodiment, the phosphor may selectively include phosphor materials that are capable of being excited by light emitted from the light emitting diode LED, for example.

Also, each of the first and second lead frames LF1 and LF2 may pass through a portion of the body part BD. Also, the exposed lead frames LF1 and FL2 and the light emitting diode LED may be connected to each other in the cavity CV through connection wires WL1 and WL2.

A light source member LM-b according to the exemplary embodiment of FIG. 16B may include a circuit board FB and a light emitting diode package LD disposed on the circuit board FB, and the light emitting diode package LD may include a light emitting diode LED and a sealing part SL'.

The sealing part SL' may surround the light emitting diode LED and have a shape of, e.g., a lens. As described in FIG. 16A, the sealing part SL' may further include a sealing resin SR or include a phosphor PP together with a sealing resin SR.

Referring to FIGS. 15, 16A, and 16B, a light emitting diode LED according to an exemplary embodiment may emit blue light. In an exemplary embodiment, a light emitting diode package LD without a separate phosphor may emit blue light. When the light emitting diode package LD emits blue light, the quantum dot QD included in the color converting member CCM of the LCD panel DP may include a first quantum dot excited by the blue light to emit green light and a second quantum dot excited by the blue light to emit red light.

Also, in an exemplary embodiment, the light emitting diode package LD may include a light emitting diode LED emitting blue light and a first phosphor excited by the blue light to emit red light. That is, the first phosphor may be a red phosphor. In this case, the light emitting diode package LD may provide blue light and red light to the LCD panel DP. The color converting member CCM of the LCD panel DP may include a first quantum dot excited by blue light to emit green light.

In another exemplary embodiment, the light emitting diode package LD may include a light emitting diode LED emitting blue light and a second phosphor excited by the blue light to emit green light. That is, the second phosphor may be a green phosphor. In this case, the light emitting diode package LD may provide blue light and green light to the LCD panel DP. The color converting member CCM of the LCD panel DP may include a second quantum dot excited by blue light to emit red light.

Light provided from the light source member LM may be converted into white light while passing through the color converting member CCM-1 and be provided to the liquid crystal layer LCL. That is, the light may be color-converted ultimately into white color through various combinations of the light emitting diode LED of the light source member LM, the phosphor PP included in the light emitting diode package LD, and the quantum dot QD included in the color converting member CCM-1.

As the base substrate having the light guide pattern part, the color converting member, and the polarizing layer are provided in an integrated manner, and the integrally provided substrate is used as the substrate of the LCD panel, the LCD device may have display quality equal to or greater in comparison with a case in which an optical member is provided separately from a display panel and realize the thickness less in comparison with the case. Also, as light provided to the liquid crystal layer is provided after passing through the color converting member including the quantum dot, the LCD device may be enhanced in color reproduction property and brightness. As the color converting member for providing white light and the light collecting pattern layer for increasing an optical efficiency are unitary with the first base substrate of the LCD panel, the LCD device according to an exemplary embodiment may allow the optical member such as the color converting member or the light collecting pattern layer to be minimally exposed to the external environment, thereby improving a reliability limitation generated when exposed to moisture or oxygen. Also, as an additional module process for coupling the optical member to the LCD panel is omitted, the productivity of manufacturing the LCD device may increase.

In an exemplary embodiment, as the color converting member or the like is unitary with the substrate of the LCD panel, the LCD panel may maintain excellent display quality and have a relatively small thickness.

In an exemplary embodiment, as the optical functional members such as the color converting member and the light collecting member are unitary with the substrate of the display panel, the LCD device may have the relatively small thickness and improved productivity.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

Hence, the real protective scope of the invention shall be determined by the technical scope of the accompanying claims.

What is claimed is:
1. A liquid crystal display panel comprising:
   a first substrate which comprises:
      a first base substrate;
      a first low refraction layer disposed on the first base substrate and having a refractive index less than that of the first base substrate;
      a color converting member disposed on the first low refraction layer and comprising a quantum dot;
      a light collecting member disposed on the color converting member; and
      a first polarizing layer disposed on the color converting member;
   a second substrate facing the first substrate; and
   a liquid crystal layer disposed between the first substrate and the second substrate,
   wherein a void is defined in the first low refraction layer,
   wherein the light collecting member comprises:
   a first light collecting pattern layer comprising a plurality of light collecting pattern parts which collect light in a direction toward the liquid crystal layer; and
   a second low refraction layer disposed on the first light collecting pattern layer and filled between the light collecting pattern parts, and
   wherein the second low refraction layer has a refractive index less than that of the first light collecting pattern layer.

2. The liquid crystal display panel of claim 1, wherein the color converting member further comprises:
   a first base surface contacting a top surface of the first low refraction layer; and
   a second base surface facing the first base surface and disposed adjacent to the first polarizing layer.

3. The liquid crystal display panel of claim 2, wherein the color converting member further comprises at least one barrier layer disposed adjacent to at least one surface of the first base surface and the second base surface.

4. The liquid crystal display panel of claim 3, wherein the at least one barrier layer comprises at least one inorganic layer.

5. The liquid crystal display panel of claim 1, wherein the color converting member further comprises:
a base resin; and
light scattering particles dispersed in the base resin.

6. The liquid crystal display panel of claim 1, wherein the first low refraction layer is disposed directly on the first base substrate.

7. The liquid crystal display panel of claim 1, wherein the first low refraction layer has a refractive index which is equal to or greater than 1.2 and equal to or less than 1.4.

8. The liquid crystal display panel of claim 1, wherein a cross-section of each of the light collecting pattern parts, which is perpendicular to the first base substrate, has a triangular shape in which two sides have a same length.

9. The liquid crystal display panel of claim 1, wherein the light collecting member further comprises:
a second light collecting pattern layer disposed on the second low refraction layer and comprising a plurality of cross pattern parts; and a third low refraction layer disposed on the second light collecting pattern layer,
each of the light collecting pattern parts has a prism shape extending in a first direction, and
each of the cross pattern parts has a prism shape extending in a second direction which is perpendicular to the first direction.

10. The liquid crystal display panel of claim 1, wherein each of the light collecting pattern parts has a lens shape protruding in the direction toward the liquid crystal layer.

11. The liquid crystal display panel of claim 1, wherein a cross-section, which is parallel to the first base substrate, of each of the light collecting pattern parts has a circular, elliptical, or polygonal shape, and
a cross-section, which is perpendicular to the first base substrate, of each of the light collecting pattern parts has a semi-circular or semi-elliptical shape.

12. The liquid crystal display panel of claim 1, wherein the light collecting member is disposed directly on the color converting member.

13. The liquid crystal display panel of claim 1, wherein the first base substrate further comprises a light guide pattern part disposed on a bottom surface of the first base substrate.

14. The liquid crystal display panel of claim 1, wherein the first substrate comprises a single glass substrate or a single polymer substrate, and
the first base substrate is the single glass substrate or the single polymer substrate.

15. The liquid crystal display panel of claim 1, wherein the second substrate comprises:
a second base substrate;
a second polarizing layer disposed on the liquid crystal layer;
a circuit layer disposed on a bottom surface of the second base substrate disposed adjacent to the liquid crystal layer; and
a color filter layer disposed between the liquid crystal layer and the circuit layer and comprising a plurality of filter parts allowing light in wavelength areas different from each other to pass therethrough.

16. The liquid crystal display panel of claim 15, wherein the second substrate further comprises a light shielding part overlapping a boundary between filter parts adjacent to each other among the filter parts.

17. The liquid crystal display panel of claim 15, wherein the first substrate further comprises a light shielding part overlapping a boundary between filter parts adjacent to each other among the filter parts and disposed on the first polarizing layer.

18. The liquid crystal display panel of claim 15, wherein the second polarizing layer is disposed between the liquid crystal layer and the color filter layer, or between the color filter layer and the second base substrate.

19. A liquid crystal display panel comprising:
a first substrate;
a second base substrate which faces the first substrate; and
a liquid crystal layer disposed between the first substrate and the second substrate;
wherein the first substrate comprises:
a first base substrate comprising a light guide pattern part;
a first low refraction layer disposed directly on the first base substrate and having a refractive index less than that of the first base substrate;
a color converting member disposed directly on the first low refraction layer and comprising a quantum dot;
a light collecting member and a first polarizing layer, which are disposed between the color converting member and the liquid crystal layer; and
a common electrode disposed on the light collecting member and the first polarizing layer, and
wherein the second substrate comprises:
a second base substrate;
a circuit layer disposed between the liquid crystal layer and the second base substrate;
a color filter layer disposed between the liquid crystal layer and the circuit layer and comprising a plurality of filter parts each emitting light having a different color;
a pixel electrode disposed between the liquid crystal layer and the color filter layer; and
a second polarizing layer disposed on the color filter layer.

20. The liquid crystal display panel of claim 19, wherein the light collecting member is disposed directly on the color converting member.

21. The liquid crystal display panel of claim 19, wherein each of the first and second substrates is bent.

22. The liquid crystal display panel of claim 21, wherein the liquid crystal layer comprises vertical alignment liquid crystal molecules.

23. A liquid crystal display device comprising:
a liquid crystal display panel comprising a first substrate and a second substrate, which face each other, with a liquid crystal layer disposed therebetween; and
a light source member configured to provide light to the liquid crystal display panel,
wherein the first substrate comprises:
a first base substrate comprising a light guide pattern part;
a first polarizing layer disposed between the first base substrate and the liquid crystal layer:
a first low refraction layer disposed between the first base substrate and the first polarizing layer and having a refractive index less than that of the first base substrate; and
a color converting member disposed between the first low refraction layer and the first polarizing layer and comprising a color converting member comprising at least one quantum dot;

a light collecting member disposed on the color converting member, and the light source member comprises a light emitting diode package having a light emitting surface facing a side surface of the first base substrate, wherein the light collecting member comprises:
- a first light collecting pattern layer comprising a plurality of light collecting pattern parts which collect light in a direction toward the liquid crystal layer; and
- a second low refraction layer disposed on the first light collecting pattern layer and filled between the light collecting pattern parts, and wherein the second low refraction layer has a refractive index less than that of the first light collecting pattern layer.

24. The liquid crystal display device of claim 23, wherein the light source member further comprises a circuit board, and the light emitting diode package is disposed on the circuit board.

25. The liquid crystal display device of claim 23, wherein the light emitting diode package comprises a light emitting diode and a sealing part which covers the light emitting diode, and the sealing part comprises at least one phosphor.

26. The liquid crystal display device of claim 25, wherein the light emitting diode emits blue light, and the at least one quantum dot comprises a first quantum dot excited by the blue light to emit green light and a second quantum dot excited by the blue light to emit red light.

27. The liquid crystal display device of claim 25, wherein the light emitting diode emits blue light, the sealing part comprises a first phosphor of the at least one phosphor excited by the blue light to emit red light, and the at least one quantum dot comprises a first quantum dot excited by the blue light to emit green light.

28. The liquid crystal display device of claim 25, wherein the light emitting diode emits blue light, the sealing part comprises a second phosphor excited by the blue light to emit green light, and the at least one quantum dot comprises a second quantum dot excited by the blue light to emit red light.

29. A display panel comprising:

a first substrate and a second substrate facing the first substrate, wherein the first substrate comprises:
- a first base substrate;
- a first low refraction layer disposed on the first base substrate and having a refractive index less than that of the first base substrate;
- a color converting member disposed on the first low refraction layer and comprising a quantum dot;
- a light collecting member disposed on the color converting member; and
- a first polarizing layer disposed on the color converting member;

wherein a void is defined in the first low refraction layer, wherein the light collecting member comprises:

a first light collecting pattern layer comprising a plurality of light collecting pattern parts which collect light in a direction toward the second substrate; and a second low refraction layer disposed on the first light collecting pattern layer and filled between the light collecting pattern parts, and wherein the second low refraction layer has a refractive index less than that of the first light collecting pattern layer.

* * * * *